(12) United States Patent
Tsukahara et al.

(10) Patent No.: US 10,114,478 B2
(45) Date of Patent: Oct. 30, 2018

(54) CONTROL METHOD, CONTROL APPARATUS, AND PROGRAM

(71) Applicant: Sony Corporation, Tokyo (JP)

(72) Inventors: Tsubasa Tsukahara, Tokyo (JP); Masatoshi Ueno, Kanagawa (JP); Shinobu Kuriya, Kanagawa (JP); Tetsuro Goto, Tokyo (JP); Kenichi Kabasawa, Saitama (JP); Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 14/385,835

(22) PCT Filed: Mar. 8, 2013

(86) PCT No.: PCT/JP2013/001504
§ 371 (c)(1),
(2) Date: Sep. 17, 2014

(87) PCT Pub. No.: WO2013/145588
PCT Pub. Date: Oct. 3, 2013

(65) Prior Publication Data
US 2015/0042563 A1    Feb. 12, 2015

(30) Foreign Application Priority Data

Mar. 30, 2012   (JP) ................................. 2012-081549

(51) Int. Cl.
*G06F 3/0346* (2013.01)
*G06F 3/01* (2006.01)

(52) U.S. Cl.
CPC ............ *G06F 3/0346* (2013.01); *G06F 3/017* (2013.01)

(58) Field of Classification Search
CPC ............................... G06F 3/017; G06F 3/0346
See application file for complete search history.

(56) References Cited

U.S. PATENT DOCUMENTS

| 5,181,181 A | 1/1993 | Glynn |
| 5,923,318 A * | 7/1999 | Zhai ...................... G06F 3/0346 345/156 |

(Continued)

FOREIGN PATENT DOCUMENTS

| EP | 2 407 862 | 1/2012 |
| JP | 06-501119 | 1/1994 |

(Continued)

OTHER PUBLICATIONS

Daniel Roetenberg: "Inertial and Magnetic Sensing of Human Motion", PhD Thesis, May 24, 2006, pp. 1-128.

(Continued)

*Primary Examiner* — Christopher E Leiby
(74) *Attorney, Agent, or Firm* — K&L Gates LLP

(57) ABSTRACT

There is provided a control method, including: outputting a displacement value depending on a displacement amount of an input device in a case where operation is input in the input device, the operation being for a control target displayed on a display apparatus, the position of the display apparatus being specified by a first coordinate system, the position of the input device being specified by a second coordinate system; calculating a displacement amount of the input device in the second coordinate system based on the displacement value; and displaying the control target, the control target being moved to a position corresponding to a displacement amount in the first coordinate system by using a transformation matrix, the transformation matrix transforming a displacement amount of the input device in the second coordinate system into a displacement amount in the first coordinate system.

13 Claims, 16 Drawing Sheets

(56) References Cited

U.S. PATENT DOCUMENTS

| | | | |
|---|---|---|---|
| 6,891,527 B1* | 5/2005 | Chapman | G06F 3/0346 345/158 |
| 8,384,665 B1* | 2/2013 | Powers, III | A63F 13/06 345/156 |
| 8,441,434 B2* | 5/2013 | Vaananen | G06F 3/0354 345/156 |
| 9,030,405 B2* | 5/2015 | Nasiri | G06F 3/017 345/156 |
| 2002/0063688 A1* | 5/2002 | Shaw | G06F 3/0312 345/163 |
| 2004/0140962 A1* | 7/2004 | Wang | G06F 3/0346 345/179 |
| 2005/0179650 A1* | 8/2005 | Ludwig | G06F 3/0346 345/156 |
| 2005/0243061 A1* | 11/2005 | Liberty | A61B 5/1101 345/158 |
| 2005/0253806 A1* | 11/2005 | Liberty | G06F 1/3215 345/156 |
| 2006/0092133 A1 | 5/2006 | Touma et al. | |
| 2009/0040175 A1* | 2/2009 | Xu | G06F 3/03543 345/156 |
| 2009/0169052 A1* | 7/2009 | Seki | G06K 9/00805 382/103 |
| 2009/0265671 A1 | 10/2009 | Sachs et al. | |
| 2009/0289924 A1* | 11/2009 | Takata | G06F 1/1626 345/184 |
| 2011/0227825 A1* | 9/2011 | Liberty | G06F 3/0346 345/158 |
| 2012/0011932 A1* | 1/2012 | Nakagawa | G06F 3/0346 73/379.02 |
| 2012/0017702 A1* | 1/2012 | Kawabe | G06F 3/0414 73/862.381 |
| 2012/0154387 A1* | 6/2012 | Tsukahara | G06F 3/0346 345/419 |
| 2012/0179408 A1* | 7/2012 | Goto | G06F 3/0346 702/104 |
| 2012/0256739 A1* | 10/2012 | Kawabe | B25J 13/025 340/407.2 |
| 2013/0027294 A1* | 1/2013 | Nakagawa | G06F 3/0346 345/156 |
| 2013/0088421 A1* | 4/2013 | Ueno | G06F 1/1694 345/156 |

FOREIGN PATENT DOCUMENTS

| | | |
|---|---|---|
| WO | 92/06465 | 4/1992 |
| WO | 2010/002997 | 1/2010 |

OTHER PUBLICATIONS

International Search Report issued in connection with International Patent Application No. PCT/JP2013/001504, dated Apr. 16, 2014. (4 pages).

* cited by examiner

CONTROL METHOD, CONTROL APPARATUS, AND PROGRAM

CROSS REFERENCES TO RELATED APPLICATIONS

The present application is a national stage of International Application No. PCT/JP2013/001504 filed on Mar. 8, 2013 and claims priority to Japanese Patent Application No. 2012-081549 filed on Mar. 30, 2012, the disclosure of which is incorporated herein by reference.

BACKGROUND

The present disclosure relates to a control method including inputting operation for a control target, which is two-dimensionally or three-dimensionally displayed on a display. The present disclosure further relates to a control apparatus and a program.

For example, mouse is widely used as input device for controlling GUIs (Graphical User Interfaces), which are two-dimensionally displayed on a display. Recently, in addition to 2D (two-dimensional) operation type input devices such as mouse, there are proposed many kinds of input devices, which may be operated in a 3D (three-dimensional) space.

Here, Patent Literature 1 discloses an input device configured to detect sextic movement, which is generated from movement of a mouse in a 3D space. The input device includes three acceleration sensors and three angular velocity sensors. The three acceleration sensors detect acceleration in three axes, respectively. The three angular velocity sensors detect rotation around the three axes, respectively. The input device transmits acceleration, velocity, relative position of the input device, and posture of the input device to a computer. The computer processes such information. As a result, it is possible to control a three-dimensionally displayed control target.

CITATION LIST

Patent Literature

[PTL 1]
Japanese Patent Application Laid-open No. H06-501119

SUMMARY

Technical Problem

Meanwhile, a 3D space operation type input device includes acceleration sensors and angular velocity sensors. A user uses the input device to thereby control a control target. In this case, when the user starts control, it is necessary to conform axes specific to the respective sensors to axes of the control target. This means the following situation. That is, in a case where a user holds the input device and starts control or correction of errors, it is necessary for him to check his hand and to cause the input device to face a predetermined direction every time.

Further, a display apparatus, which three-dimensionally displays an image, allows a user to recognize 3D information due to trick of the eye. Because of this, if a user frequently changes the direction of his gaze to check his hand, he may feel tired. Further, if a user checks his hand and at the same time controls a control target displayed on a display, operation intuitiveness is decreased significantly.

Because of this, it is necessary to naturally conform movement of a control target to movement of an input device at hand. It is necessary to transform values (hereinafter, referred to as "displacement values"), which are output from sensors provided in an input device, to travel distance of a control target. In the case of transformation, calculation errors are likely to accumulate. Here, if calculation errors accumulate, a gap between movement of the input device and movement of the control target may be generated. As a result, user-friendliness of the input device is decreased significantly.

In view of the above-mentioned circumstances, it is desirable to provide an input device capable of controlling a two-dimensionally or three-dimensionally displayed control target even if a user does not check his hand and does not cause the input device to face a predetermined direction.

Solution to Problem

According to an embodiment of the present disclosure, there is provided a control method, including: outputting a displacement value depending on a displacement amount of an input device in a case where operation is input in the input device, the operation being for a control target displayed on a display apparatus, the position of the display apparatus being specified by a first coordinate system, the position of the input device being specified by a second coordinate system; calculating a displacement amount of the input device in the second coordinate system based on the displacement value; and displaying the control target, the control target being moved to a position corresponding to a displacement amount in the first coordinate system by using a transformation matrix, the transformation matrix transforming a displacement amount of the input device in the second coordinate system into a displacement amount in the first coordinate system.

According to the embodiment of the present disclosure, it is possible to control a control target depending on movement of an input device.

Advantageous Effects of Invention

According to the embodiment of the present disclosure, the control method includes displaying the control target, the control target being moved to a position corresponding to a displacement amount in the first coordinate system by using a transformation matrix, the transformation matrix transforming a displacement amount of the input device in the second coordinate system into a displacement amount in the first coordinate system. Because of this, a user is capable of naturally moving the control target in a direction that the user wishes to control the control target by using the input device. User-friendliness of the input device, which has no directionality, is improved.

Additional features and advantages are described herein, and will be apparent from the following Detailed Description and the figures.

DESCRIPTION OF EMBODIMENTS

Hereinafter, embodiments of the present disclosure will be described in detail with reference to the attached drawings. Note that, in the present description and drawings, the same reference symbols are attached to structural elements having substantially the same functions and configurations, and repetition in descriptions thereof are avoided. A computer executes programs, whereby an input device realizes a control method. Internal blocks (described below) execute the control method in cooperation with each other.

1. Embodiment (example of transforming values in local coordinate system into global coordinate system)
2. Modification examples 1. Embodiment Entire Configuration of System First, with reference to FIG. 1, a control system according to an embodiment of the present disclosure will be described.

Figure 1:
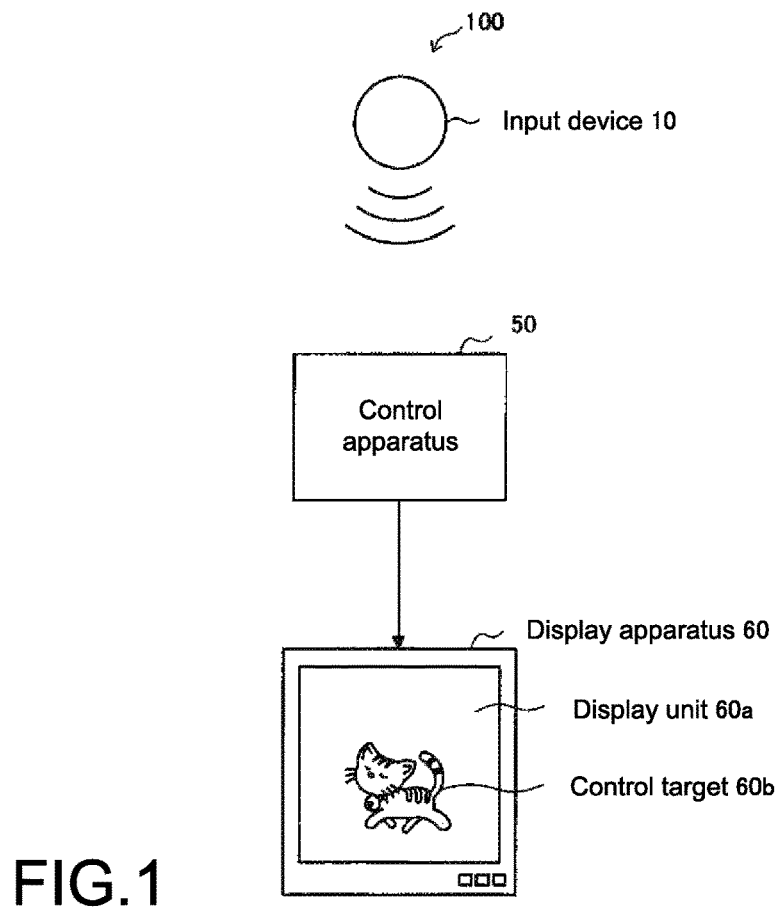
FIG. 1 is a block diagram showing a configuration example of a control system according to an embodiment of the present disclosure, the control system including an input device, a control apparatus, and a display apparatus.

FIG. 1 shows a control system 100 including an input device 10 according to an embodiment and embodiments (described below) of the present disclosure. The control system 100 includes the input device 10, a control apparatus 50, and a display apparatus 60.

The input device 10 is a device having a spherical shape. A user inputs operation in order to control the control target 60$b$, for example. The control target 60$b$ is displayed on a display of a display unit 60$a$. The control apparatus 50 controls the displayed control target 60$b$ in response to operation input in the input device 10.

The control apparatus 50 may be an apparatus dedicated for the input device 10, or may be a PC or the like. In this manner, a user operates the input device 10 of the control system 100, to thereby remote control the control target 60$b$ displayed on the display unit 60$a$.

Note that the display unit 60$a$ includes, for example, a liquid crystal display, an EL (Electro-Luminescence) display, or the like. The display unit 60$a$ may display a 2D image or may display a 3D image. The display unit 60$a$ two-dimensionally or three-dimensionally displays the control target 60$b$, which is controlled by the input device 10.

The control target 60$b$ such as a GUI is two-dimensionally displayed on the display unit 60$a$. Examples of such a GUI include, for example, a pointer, an icon, a window, and the like. The control target 60$b$ such as a human-shaped or animal-shaped character image is three-dimensionally displayed. Note that those are merely examples. The control target 60$b$ may be any image as long as it is two-dimensionally or three-dimensionally displayed.

Further, the display apparatus 60 may be a television apparatus capable of receiving television broadcasting and the like. Alternatively, the display apparatus 60 displays the control target 60$b$ three-dimensionally. In this case, the display apparatus 60 may be a stereoscopic image display apparatus, which displays a stereoscopic image such that a user is capable of visually recognizing the stereoscopic image with the naked eye. FIG. 1 shows a case where the control apparatus 50 is independent from the display apparatus 60. Alternatively, an all-in-one apparatus including the control apparatus 50 and the display apparatus 60 may be used. Further, the display apparatus, which is configured to display the control target 60b, may be a projector or the like. In this case, a projector may control the control target 60b, which is projected on a screen or a wall surface.

The position of the display apparatus 60 is specified by a global coordinate system, i.e., a first coordinate system (described below). The position of the input device 10 is specified by a local coordinate system, i.e., a second coordinate system (described below). Further, a user inputs operation for controlling the control target 60b in the input device 10. Then, the control apparatus 50 controls the display apparatus 60 such that the control target 60b moves by a displacement amount of the input device 10 and is displayed.

(Structural Example of Input Device)

Figure 2:
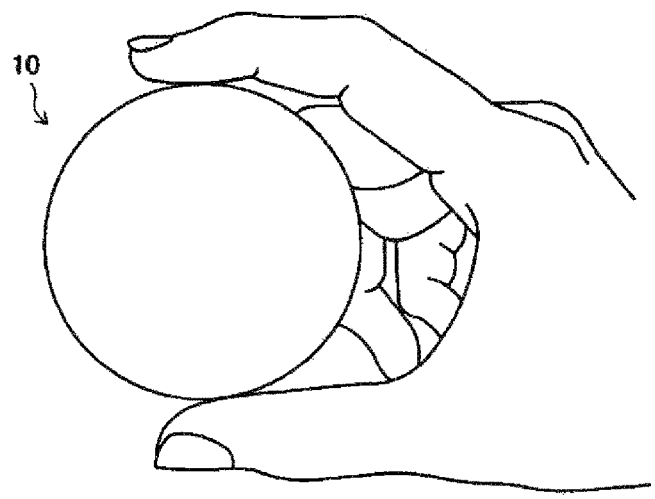
FIG. 2 is an explanatory diagram showing a state where a user grips the input device according to the embodiment of the present disclosure.

FIG. 2 is a diagram showing a state where a user grips the input device 10. As shown in FIG. 2, the input device 10 has a spherical shape. The input device 10 is slightly larger or slightly smaller than a hardball of baseball. The diameter of the input device 10 is, for example, about 50 mm to 100 mm. Since the input device 10 has such a size, a user is capable of handling the input device 10 easily when he grips the input device 10. Note that the diameter of the input device 10 is not limited to the above-mentioned range. As a matter of course, the diameter of the input device 10 may be another value.

Figure 3:
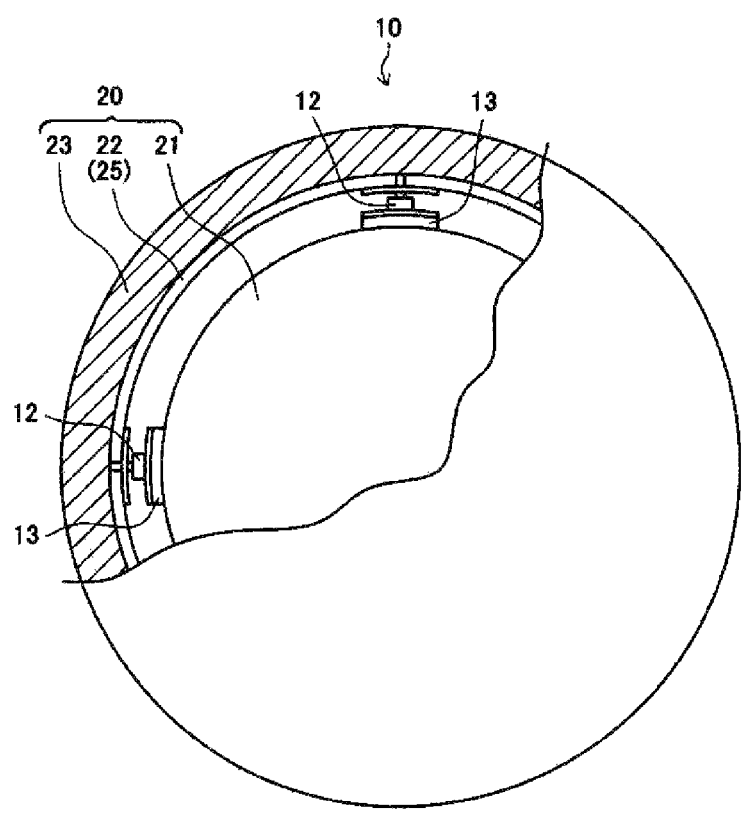
FIG. 3 is a partial cross-sectional view showing the input device according to the embodiment of the present disclosure.
Figure 4:
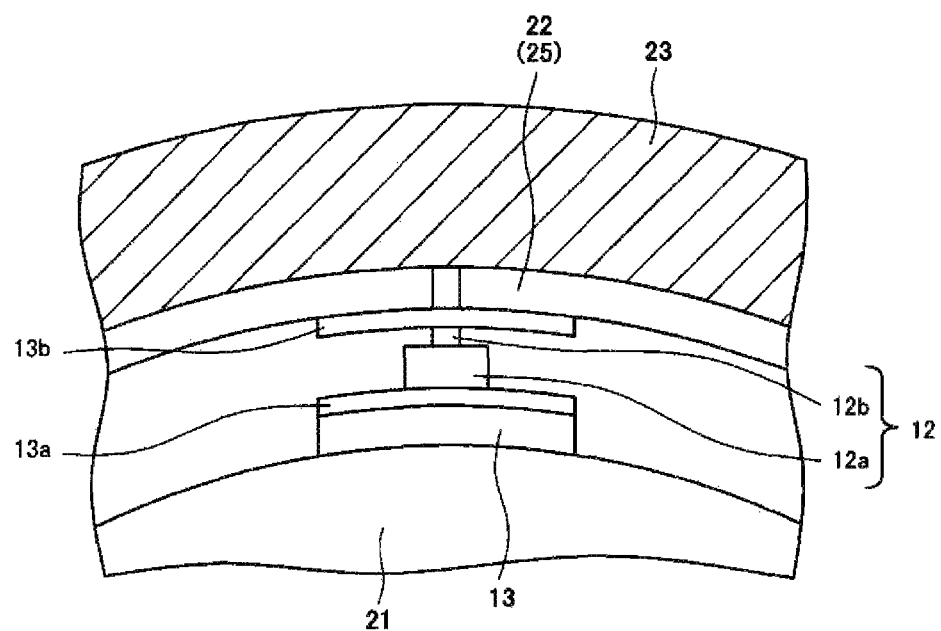
FIG. 4 is a partial enlarged view of the cross-sectional view of FIG. 3.
Figure 5A:
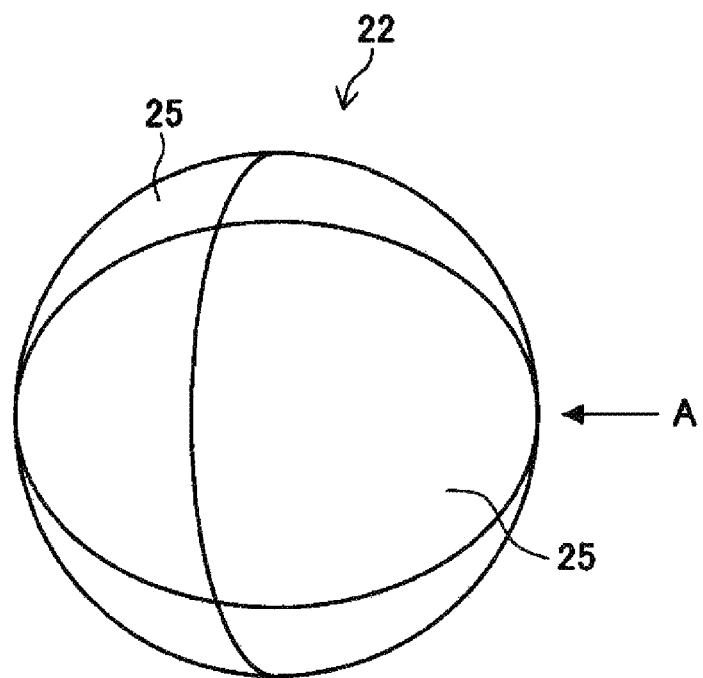
FIGS. 5A and 5B are external views each showing a shell part of the input device according to the embodiment of the present disclosure.
Figure 5B:
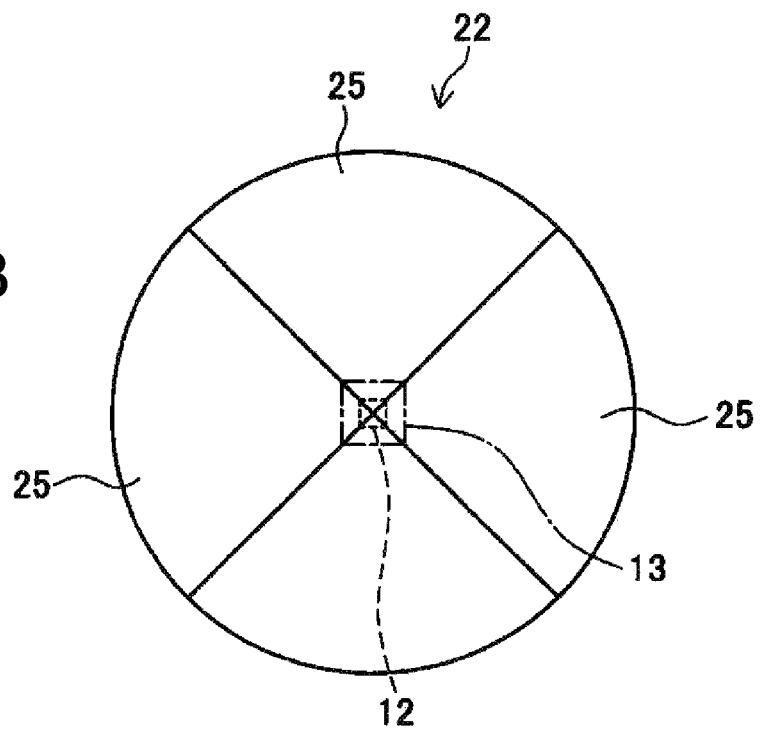

FIG. 3 is a partial cross-sectional view showing the input device 10. FIG. 4 is an enlarged view showing a part of the cross-sectional view of FIG. 3. Further, each of FIGS. 5A and 5B is an external view showing a shell part 22 of the input device 10. FIG. 5A shows a state where the shell part 22 is seen from the oblique upward direction. FIG. 5B shows a state where the shell part 22 is seen from the A direction of FIG. 5A.

The input device 10 includes an input device main body 20. The input device main body 20 includes a base part 21, a shell part 22, and a gripper part 23. The base part 21 is provided at the center portion of the input device 10, and has a spherical shape. The shell part 22 is provided so as to cover the whole surface of the base part 21, and has a spherical shell shape. The gripper part 23 is provided so as to cover the whole surface of the shell part 22. The outline of the input device main body 20 is a sphere or an approximate sphere. Operation for controlling the control target 60b, which is displayed on the display apparatus 60, is input in the input device main body 20.

Further, the input device 10 includes tactile switches 12 (switch unit). The tactile switches 12 detect that the input device 10 is gripped with force equal to or larger than a predetermined force, and gives a user a click feeling. Further, the input device 10 includes pressure-sensitive sensors 13 (pressure sensors, which detect grip strength). The pressure-sensitive sensors 13 detect grip strength when a user grips the input device 10.

The base part 21 has a hollow inside. A circuit board is provided in the hollow portion in the base part 21. Electronic components including a CPU 11 and the like are mounted on the circuit board.

The shell part 22 includes eight plates 25 having the same shape (see FIGS. 5A and 5B). The shape of each plate 25 is an approximate regular triangle. Further, vertexes of corner portions of adjacent four plates 25 out of the eight plates 25 meet at one point. In total, there are six points, at which vertexes meet. The tactile switches 12 and the pressure-sensitive sensors 13 are arranged at positions corresponding to the six points, respectively. That is, the input device 10 of this embodiment includes six tactile switches 12 and six pressure-sensitive sensors 13. The tactile switches 12 and the pressure-sensitive sensors 13 are provided between the surface of the base part 21 and the inner surface of the shell part 22 (plates 25) (see FIG. 3 and FIG. 4).

The pressure-sensitive sensors 13 are provided on the surface of the base part 21. The tactile switches 12 are provided on the pressure-sensitive sensors 13, respectively. A first pressure diffusion plate 13a intervenes between the pressure-sensitive sensor 13 and the tactile switch 12. A second pressure diffusion plate 13b intervenes between the tactile switch 12 and the inner surface of the shell part 22 (plates 25). Transmitting grip strength is generated when a user grips the gripper part 23. The first pressure diffusion plate 13a and the second pressure diffusion plate 13b are capable of transmitting the grip strength to the pressure-sensitive sensor 13 uniformly. The pressure-sensitive sensor 13 senses grip strength when a user grips the input device main body 20.

The tactile switch 12 includes a switch main body 12a and a movable part 12b. The movable part 12b is capable of moving with respect to the switch main body 12a. Further, the tactile switch 12 includes an electric switch mechanism (not shown) inside. The electric switch mechanism is turned on/off in response to movement of the movable part 12b. Further, the tactile switch 12 includes click feeling generating mechanism (not shown). The click feeling generating mechanism employs an elastic body such as a plate spring. Such an elastic body generates click feeling in response to movement of the movable part 12b.

Here, the relation between the pressure-sensitive sensors 13 and force applied to the plate 25 will be described. Force applied to one plate 25 and a force-applied position are calculated based on pressure values detected by the pressure-sensitive sensors 13. In this case, at least three pressure-sensitive sensors 13 are required for one plate 25.

In this embodiment, three pressure-sensitive sensors 13 are provided for one plate 25. The three pressure-sensitive sensors 13 detect force applied to the plate 25 (this plate 25 and other plates 25 share pressure-sensitive sensors 13). With this structure, calculation employing vector calculation or the like is executed based on pressure values output from the pressure-sensitive sensors 13. As a result, it is possible to calculate force applied to the plate 25 and a force-applied position accurately.

Further, three pressure-sensitive sensors 13 are used for each of the eight plates 25. In this case, essentially, two dozens of pressure-sensitive sensors 13 are required (8×3=24). However, according to this embodiment, the pressure-sensitive sensor 13 is arranged at a position at which vertexes of corner portions of adjacent four plates 25 meet. The adjacent four plates 25 share one pressure-sensitive sensor 13. Because of this structure, the six pressure-sensitive sensors 13 are enough in total. It is possible to reduce cost of the input device 10. As described above, it is possible to accurately calculate force applied to the plate 25 and a force-applied position with the minimum number of pressure-sensitive sensors 13.

However, the pressure-sensitive sensors 13 may not always have the above-mentioned structure. For example, one pressure-sensitive sensor 13, two pressure-sensitive sensors 13, or four or more pressure-sensitive sensors 13 may be provided for one plate 25. Further, the plates 25 may not share the pressure-sensitive sensor 13. That is, the pressure-sensitive sensors 13 may be provided for the plates 25, respectively.

Typically, the pressure-sensitive sensors 13 may employ any mode as long as the pressure-sensitive sensors 13 are capable of detecting force applied to the plates 25 (shell part 22) when a user grips the input device 10. Further, the number of the plates 25 (division number of shell part 22) may not be limited to eight. For example, the number of the plates 25 may be two, four, or the like.

Each of the base part 21 and the shell part 22 is made of materials such as, for example, metal or resin. Meanwhile, the gripper part 23 is made of a material softer than the base part 21 and the shell part 22. As a material of the gripper part 23, for example, sponge or the like, i.e., foamed synthetic resin such as polyurethane, may be used. In a case where a material such as sponge is used as a material of the gripper part 23, tactile impression may be improved. Further, a user is capable of slightly adjusting grip strength when he grips the input device 10.

Next, with reference to FIG. 6 and FIG. 7, the electric configuration of the control system 100 will be described.

Figure 6:
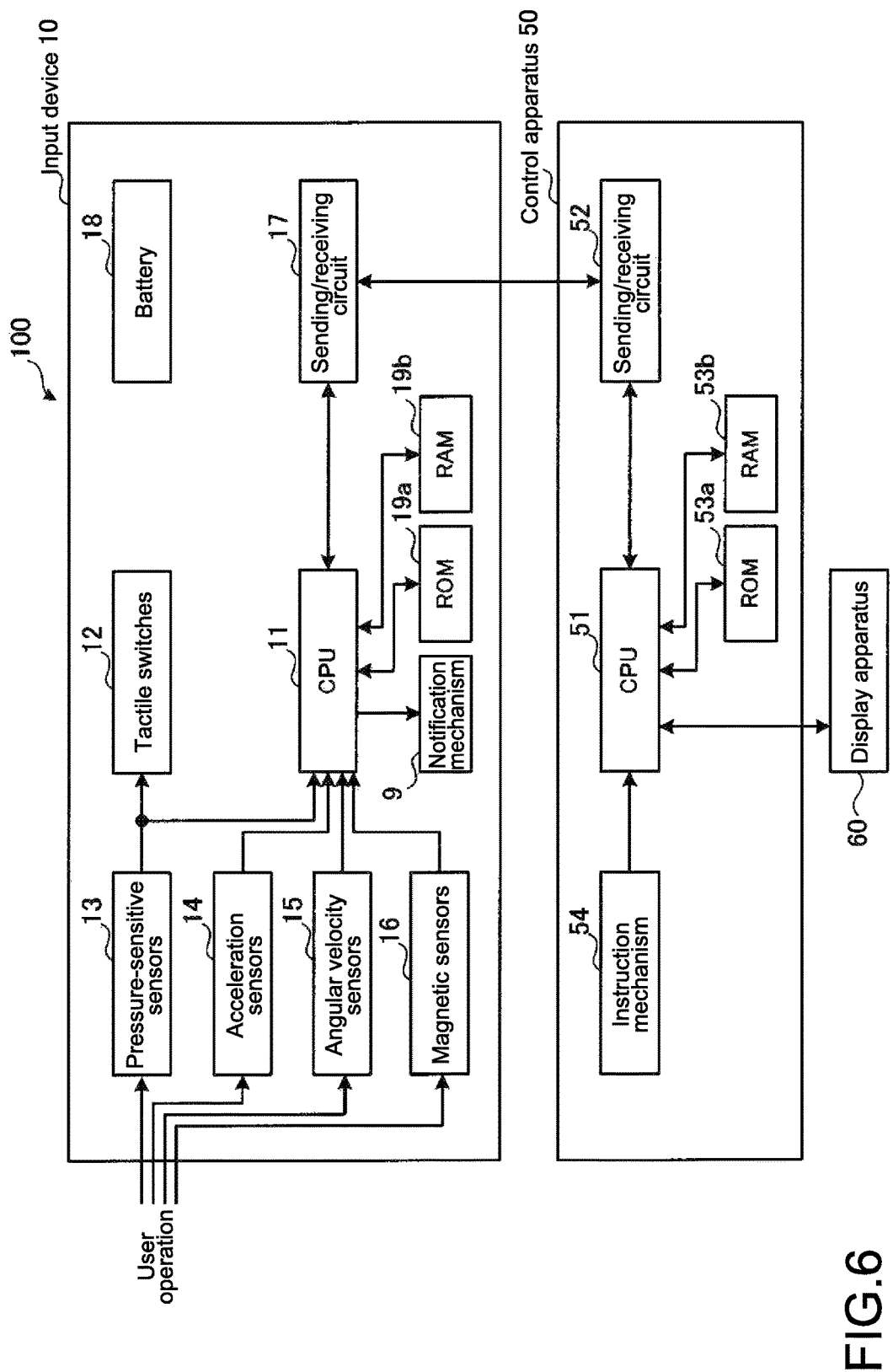
FIG. 6 is a block diagram showing the electric configuration of the control system according to the embodiment of the present disclosure.

FIG. 6 is a block diagram showing the electric configuration of the control system 100.

Figure 7:
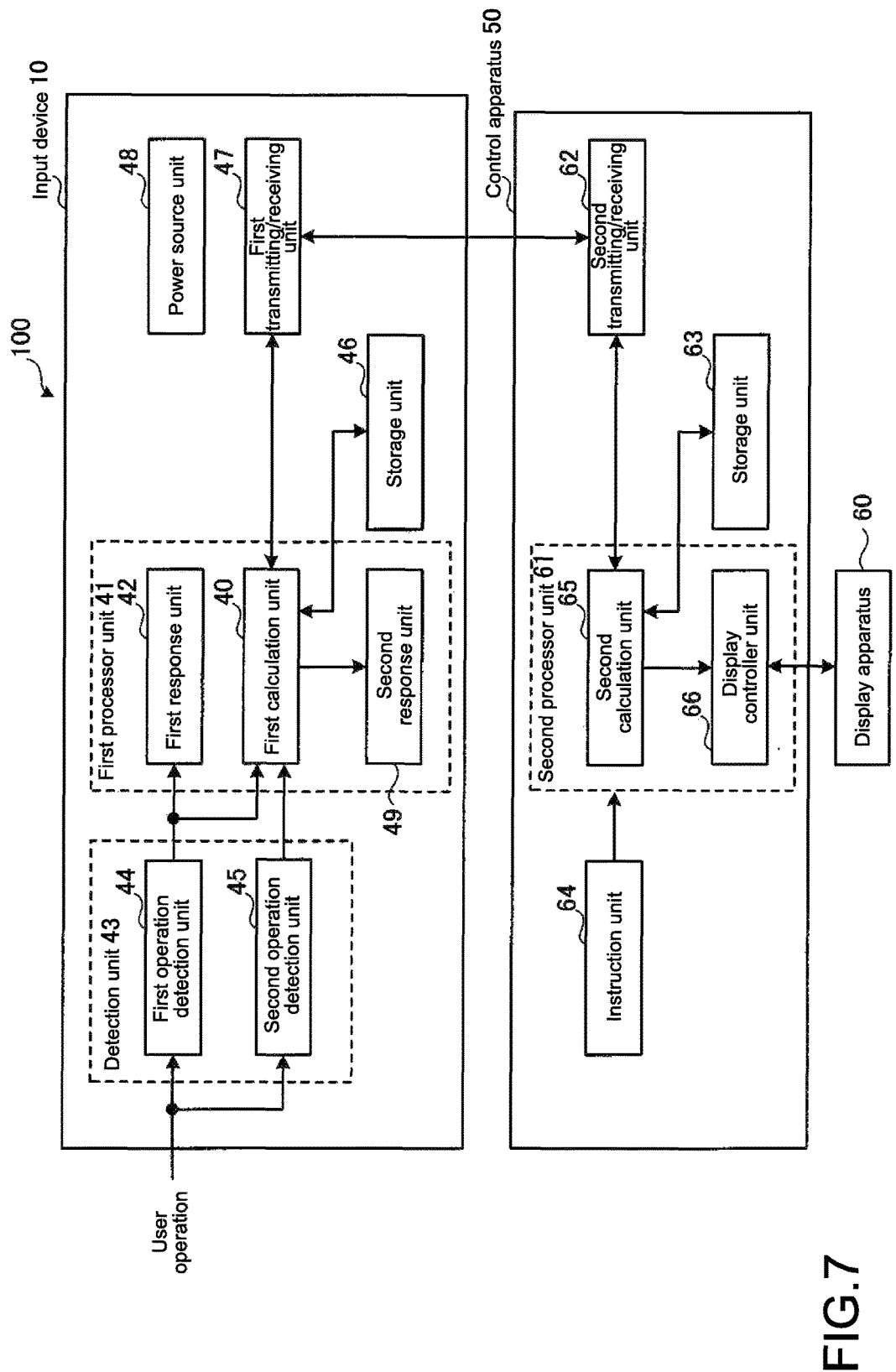
FIG. 7 is a functional configuration diagram showing the control system according to the embodiment of the present disclosure.

FIG. 7 is a functional configuration diagram showing the control system 100.

First, with reference to FIG. 6, the electric configuration of the input device 10 will be described.

The input device 10 includes a notification mechanism 9, the CPU (Central Processing Unit) 11, the tactile switches 12, the pressure-sensitive sensors 13, acceleration sensors 14, angular velocity sensors 15, and magnetic sensors 16. Further, the input device 10 includes a sending/receiving circuit 17, a battery 18, a ROM (Read Only Memory) 19a, and a RAM (Random Access Memory) 19b. Note that the notification mechanism 9 may employ a light emitting mechanism such as an LED (Light Emitting Diode), a sound producing mechanism such as a speaker, or a vibration generating mechanism. In this case, the notification mechanism 9 may carry out notification by means of at least one of sound producing, light emitting, and vibration generating.

The notification mechanism 9, the CPU 11, the acceleration sensors 14, the angular velocity sensors 15, the magnetic sensors 16, the sending/receiving circuit 17, the ROM 19a, and the RAM 19b are mounted on the circuit board (not shown). The circuit board, on which the electric components are mounted, and the battery 18 are provided in the hollow portion in the base part 21. In this manner, the respective sensors are accommodated in the input device main body 20.

Each of the acceleration sensors 14 and the angular velocity sensors 15 is a sensor configured to detect movement of the input device 10 in the 3D space. The acceleration sensors 14 detect acceleration in three-axis directions orthogonal to each other. The acceleration sensors 14 output acceleration values (example of displacement value) to the CPU 11. The acceleration values depend on the detected acceleration. The angular velocity sensors 15 detect angular velocity around the three axes orthogonal to each other. The angular velocity sensors 15 output angular velocity values (example of displacement value) to the CPU 11. The angular velocity values depend on the detected angular velocity. Further, the magnetic sensors 16 detect geomagnetic directions (for example, magnetic north) of the input device 10 in the 3D space. The magnetic sensors 16 output magnetic values (example of displacement value) to the CPU 11.

The tactile switches 12, the pressure-sensitive sensors 13, a touch sensor, and the like function as a pressure-sensitive unit. When the switch mechanism is turned on, the tactile switch 12 outputs a signal to the CPU 11. The pressure-sensitive sensor 13 is an example of a pressure sensor. Such a pressure sensor outputs a pressure value to the CPU 11. The pressure value depends on grip strength when a user grips the input device 10.

The CPU 11 executes various kinds of calculation based on angular velocity values output from the acceleration sensors 14, acceleration values output from the angular velocity sensors 15, magnetic values output from the magnetic sensors 16, and pressure values output from the pressure-sensitive sensors 13, in order to control the control target 60b. Further, operation for controlling the control target 60b, which is displayed on the display apparatus 60, is input in the input device 10. Then, the CPU 11 outputs displacement values depending on displacement amounts of the input device 10. The displacement amounts include, for example, acceleration values, angular velocity values, magnetic values, and pressure values. Further, the displacement amount is obtained based on displacement amounts of one axis, two axes orthogonal to each other, or three axes orthogonal to each other.

The CPU 11 sends the obtained acceleration values, angular velocity values, magnetic values, and pressure values from the sending/receiving circuit 17 to the control apparatus 50. Note that the CPU 11 may calculate grip strength when a user grips the input device 10, a force-applied position, and the like based on the obtained acceleration values, angular velocity values, magnetic values, and pressure values. Specifically, the grip strength, the force-applied position, and the like include a travel distance of the input device 10 in the space, a rotational amount, an angle with respect to the magnetic north, and the like. Note that the CPU 11 executes various kinds of calculation in a state where the switch mechanisms of the tactile switches 12 input signals in the CPU 11.

The sending/receiving circuit 17 includes an antenna (not shown) and the like. Controlled by the CPU 11, the sending/receiving circuit 17 sends various kinds of information to the control apparatus 50. Note that the sending/receiving circuit 17 is also capable of receiving information sent from the control apparatus 50.

A rechargeable secondary battery, for example, is used as the battery 18. A charging unit (not shown) is accommodated in the input device main body 20.

The notification mechanism 9 notifies a user that the control target 60b is displaced. Here, the notification mechanism 9 may notify a user of a displacement amount of travel of the control target 60b with respect to each axis, independently.

Next, with reference to FIG. 7, the functional configuration of the input device 10 will be described. The input device 10 includes a detection unit 43, a first processor unit 41, a storage unit 46, a first transmitting/receiving unit 47, and a power source unit 48. The detection unit 43 includes a first operation detection unit 44, and a second operation detection unit 45. The first processor unit 41 includes a first response unit 42, a first calculation unit 40, and a second response unit 49.

The detection unit 43 detects that the input device main body 20 is gripped by a user with force equal to or larger than a predetermined force. For example, the detection unit 43 detects grip strength when the input device main body 20 is gripped. The detection unit 43 outputs the detected grip strength value depending on the grip strength. The first operation detection unit 44 detects first operation, which is input in the input device main body 20. The first operation is not limited to griping the input device 10. Examples of the first operation include griping the input device 10, raising the input device 10 from a table, tapping the input device 10, and the like. The first operation detection unit 44 may detect that, for example, the input device main body 20 is gripped with predetermined pressure (for example, first threshold) or more. Further, the first operation detection unit 44 may output a detected grip strength value based on the detection result. The grip strength value depends on grip strength.

After the first operation detection unit 44 detects the first operation, the second operation detection unit 45 detects second operation input in the input device main body 20. The second operation detection unit 45 detects second operation after the first operation detection unit 44 detects the first operation. That is, the first operation and the second operation are not detected simultaneously.

The second operation is not limited to griping the input device 10. Examples of the second operation include grabbing and operating the input device 10 (grabbing and shaking input device 10) and the like. Detected values, which are detected by the first operation detection unit 44 and the second operation detection unit 45, may include values sensed by at least one of the pressure-sensitive sensors 13, the acceleration sensors 14, the angular velocity sensors 15, and the magnetic sensors 16. The second operation detection unit 45 detects that, for example, the input device main body 20 is gripped with pressure equal to or larger than a predetermined pressure (second threshold). The second threshold, which has a value larger than the first threshold, is preset.

The first response unit 42 returns a first response from the input device 10 based on the detected first operation. Examples of the first response include producing click sound, returning bounce to the hand of a user, who grips the input device 10, by means of a spring provided in the input device 10, and the like. Note that the first response unit 42 does not necessarily return a first response to a user based on detected first operation. For example, the first response unit 42 may return a first response to a user when the detection unit 43 detects that the input device 10 is gripped, and when the detection unit 43 detects that the input device 10 is not gripped. The first response unit 42 may return a first response to a user without being controlled by the first processor unit 41, at least when the detection unit 43 detects that the input device main body 20 is gripped. Further, basically, the first response is immediately returned because the first response is returned without using the CPU 11. Alternatively, the first response may be returned by using the CPU 11.

The first calculation unit 40 may execute calculation (first processing) for controlling the control target 60b based on a displacement value with respect to movement of the input device main body 20. The movement of the input device main body 20 depends on the first operation. The first calculation unit 40 may execute calculation (second processing) for controlling the control target 60b based on detected movement of the input device main body 20. The movement of the input device main body 20 depends on the second operation.

Note that the first operation detection unit 44 is capable of causing the first response unit 42 to return a response without using the first calculation unit 40. Because of this, the first response unit 42 is capable of returning a response, i.e., click sound, to a user without sending a first response to the first calculation unit 40. As a result, it is possible to return a first response, i.e., click sound, by the first response unit 42 faster than processing by the first calculation unit 40 based on a calculation result. However, the responding process is not limited to this. Alternatively, a first response (click sound, for example) may be sent to the first calculation unit 40. The first response may be used as a trigger to start calculation by the first calculation unit 40.

Further, the first processing and the second processing are different kinds of control to the control target 60b, and do not involve the same kind of control. An example of the different kinds of control is as follows. That is, as the first processing, click sound is generated in a case where grip strength is equal to or more than predetermined first threshold pressure when a user grips the input device 10. As the second processing, calculation for controlling the control target 60b is executed based on displacement values output from the various sensors in a case where a user grips the input device 10 more tightly and where grip strength is equal to or more than predetermined second threshold pressure. Another example of the different kinds of control is as follows. That is, as the first processing, in a case where a user grips the input device 10 for two seconds, an "enable" (operation input OK) status is established, and a cursor move mode is started. As the second processing, in a case where a user grips the input device 10 again for four seconds, the control target 60b is selected, and a control mode is started. An example of the same kind of control is as follows. That is, the pressure-sensitive sensor 13 detects three levels of values. The first processing is executed when a user grips the input device 10 lightly. The second processing is executed when a user grips the input device 10 tightly. The first processing and the second processing of the embodiments do not involve such a same kind of control.

Note that the first response unit 42 does not send the first response to the control apparatus 50, which controls the control target 60b. The first response is for a user of the input device. That is, the control apparatus 50 does not receive the first response from the first response unit 42. The first calculation unit 40 sends a calculation result for controlling the control target 60b to the control apparatus 50. That is, the control apparatus 50 receives the calculation result from the first calculation unit 40. As described above, the first response processing by the first response unit 42 involves a route including no sending/receiving process. As a result, the first response processing is faster than processing based on a calculation result by the first calculation unit 40, which includes sending/receiving process, and is thus effective.

The second response unit 49 returns a second response from the input device 10 based on a detected second operation. An example of the second response is to give feedback to a user. Examples of the feedback are as follows. That is, an LED of the notification mechanism 9 of the input device 10 blinks, the notification mechanism 9 outputs sound, the notification mechanism 9 causes a user to feel a sense of force, and the notification mechanism 9 vibrates. Basically, the second response is immediately returned because the second response is returned without using the CPU 11. Alternatively, the second response may be returned by using the CPU 11.

Further, as necessary, both of or one of the first processor unit 41 and a second processor unit 61 of the control apparatus side execute desired process based on detection results, and outputs the results to a display controller unit 66 via the second processor unit 61.

The storage unit 46 may be realized by the ROM 19a or the RAM 19b including, for example, a semiconductor memory, a magnetic disk, an optical disk, or the like.

The first transmitting/receiving unit 47 sends or receives predetermined information between the input device 10 and the control apparatus 50. The first transmitting/receiving unit 47 is wired or wireless-connected to a second transmitting/receiving unit 62. The power source unit 48 includes, for example, a rechargeable battery as the battery 18, and supplies electric power to the respective units.

(Configuration of Control Apparatus)

Next, with reference to FIG. 6, the electric configuration of the control apparatus 50 will be described.

The control apparatus 50 includes a CPU 51, a sending/receiving circuit 52, a ROM 53*a*, a RAM 53*b*, and an instruction mechanism 54.

The ROM 53*a* is a nonvolatile memory, and stores various programs necessary for processing executed by the CPU 51. The RAM 53*b* is a volatile memory, and is used as a work area for the CPU 51.

The sending/receiving circuit 52 includes an antenna and the like, and receives various kinds of information sent from the input device 10. Further, the sending/receiving circuit 52 is also capable of sending a signal to the input device 10.

The instruction mechanism 54 is, for example, a keyboard. A user inputs setting such as initial setting and special setting by using the instruction mechanism 54. The instruction mechanism 54 receives various instructions from a user, and outputs input signals to the CPU 51.

The CPU 51 executes functions of a second processor unit (described below). The second processor unit executes processing of a second calculation unit and processing of a display controller unit. The CPU 51 controls a control target, which is displayed on the display apparatus 60, based on various kinds of information received by the sending/receiving circuit 17.

Next, with reference to FIG. 7, the functional configuration of the control apparatus 50 will be described.

The control apparatus 50 includes the second processor unit 61, a storage unit 63, the second transmitting/receiving unit 62, and an instruction unit 64. The second processor unit 61 includes a second calculation unit 65, and the display controller unit 66.

The second transmitting/receiving unit 62 sends/receives predetermined information to/from the first transmitting/receiving unit 47. The storage unit 63 may be realized by the ROM 53*a* or the RAM 53*b* including, for example, a semiconductor memory, a magnetic disk, an optical disk, or the like.

For example, in a case where a user inputs operation by using the instruction mechanism 54 such as a keyboard, the instruction unit 64 executes setting such as initial setting and special setting. Specifically, the instruction unit 64 receives various instructions from a user, outputs the input signals to the second processor unit 61, and instructs the instruction unit 64 to execute initial setting and the like.

The second calculation unit 65 executes desired processing based on a detection result and a calculation result from the first processor unit 41, and outputs the results to the display controller unit 66. Further, the second calculation unit 65 calculates a displacement amount of the input device 10 in a local coordinate system (described below) based on a displacement value received from the input device 10. Note that the first calculation unit 40 of the input device 10 may calculate a displacement amount of the input device 10, and may send the calculated displacement amount to the control apparatus 50.

The display controller unit 66 controls how to display the control target 60*b* based on obtained information. Here, the display controller unit 66 displays the control target 60*b* as follows. That is, the display controller unit 66 moves the control target 60*b* to a position corresponding to a displacement amount in a global coordinate system by using a transformation matrix. The transformation matrix is used to transform a displacement amount of the input device 10 in a local coordinate system (described below) to a displacement amount in the global coordinate system. The transformation matrix is used to transform acceleration values and angular velocity values in a local coordinate system into acceleration and angular velocity of the control target 60*b* in the global coordinate system. Note that the control apparatus 50 may include an expression unit in place of the display controller unit 66 or in addition to the display controller unit 66. The expression unit is capable of expressing an action (for example, sound, vibration, etc.) other than display of the control target 60*b*. The expression unit controls expression of the control target 60*b* in response to desired input operation based on obtained information.

(Behavior of Input Device)

Figure 8A:
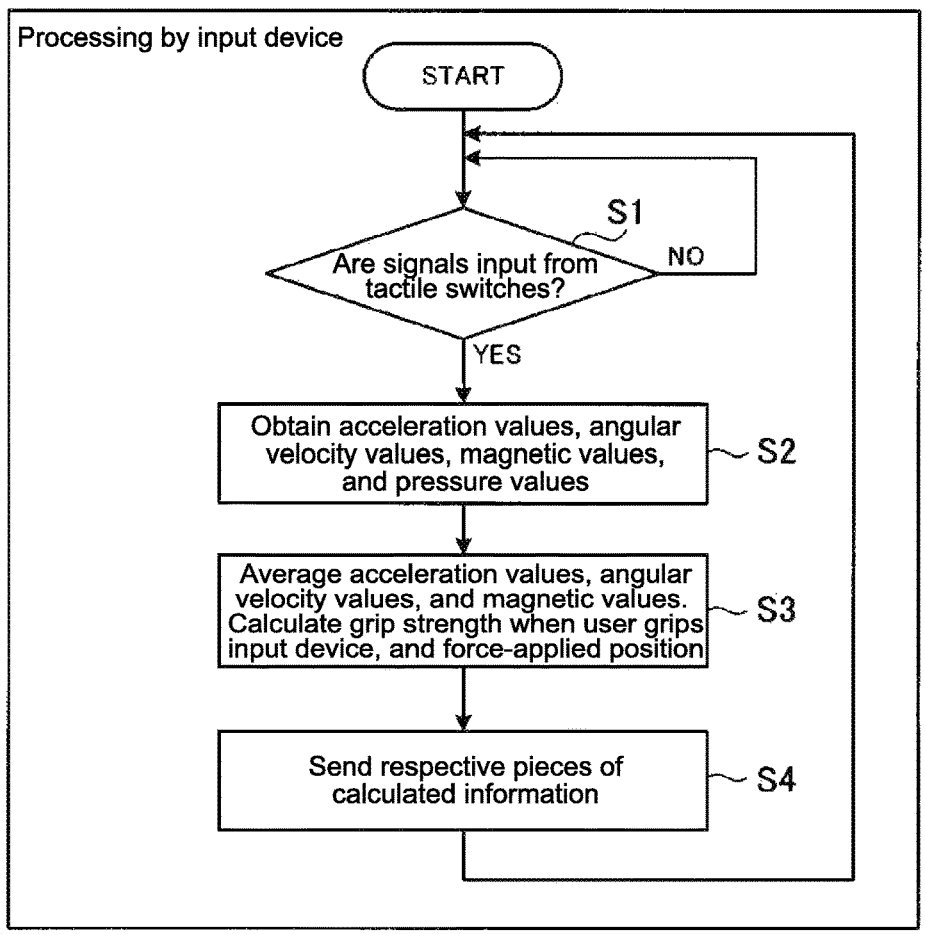
FIGS. 8A and 8B are flowcharts showing a behavior example of the control system according to the embodiment of the present disclosure.
Figure 8B:
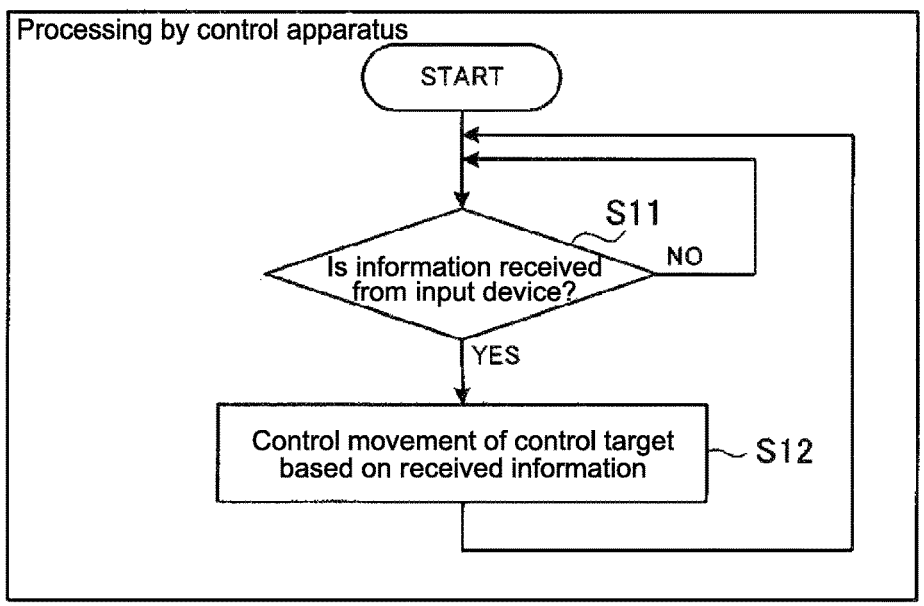

Next, behavior of the control system 100 of this embodiment will be described. FIGS. 8A and 8B are flowcharts showing a behavior example of the control system 100 of this embodiment. FIG. 8A shows processing executed by the input device 10. FIG. 8B shows processing executed by the control apparatus 50.

The input device 10 sends all the values obtained from various sensors to the control apparatus 50. Further, the control apparatus 50 executes integral calculation and coordinate transformation based on the values received from the input device 10.

First, a user raises the input device 10, and moves the input device 10 to a position at which he may operate the input device 10 easily. Note that, in this case, the control target 60*b*, which is displayed on the display unit 60*a*, does not move (see Step S1, No). Next, the user grips the gripper part 23 of the input device main body 20 with force equal to or larger than predetermined force in order to start to operate the input device 10. Then, the shell part 22 (plates 25) of the input device main body 20 and the movable parts 12*b* of the tactile switches 12 move in directions that they come close to the center of the input device 10. When the movable parts 12*b* of the tactile switches 12 move in directions that they come close to the center of the input device 10, the click feeling generating mechanisms generate click feeling.

The input device 10 returns a response (example of first response), i.e., click feeling, whereby the input device 10 is capable of appropriately returning a response to intention of a user to start to control the control target 60*b*. Then, a user is capable of easily recognizing, with the click feeling, that control of the control target 60*b* is started. Further, the click feeling generating mechanisms are capable of returning a response, i.e., click feeling, to a user immediately because the click feeling generating mechanisms return a response, i.e., click feeling, without using the CPU.

When the movable parts 12*b* of the tactile switches 12 move in directions that they come close to the center of the input device 10, click feeling is generated. At the same time, the switch mechanisms of the tactile switches 12 are turned on, and the switch mechanisms input signals to the CPU 11 (Step S1, Yes).

When the tactile switches 12 input the signals, the CPU 11 obtains acceleration values from the acceleration sensors 14, angular velocity values from the angular velocity sensors 15, and magnetic values from the magnetic sensors 16. The CPU 11 obtains pressure values from the pressure-sensitive sensors 13 (Step S2).

Next, the CPU 11 averages the acceleration values, the angular velocity values, and the magnetic values (Step S3). Further, the CPU 11 executes calculation based on the pressure values by means of vector calculation and the like. As a result, the CPU 11 calculates grip strength (force applied to plates 25) when a user grips the input device 10, and a force-applied position.

Next, the CPU 11 sends the respective pieces of information (average acceleration value, average angular velocity value, average magnetic value, grip strength when user grips input device 10, and force-applied position) to the control apparatus 50 via the sending/receiving circuit 17 (Step S4).

The CPU 51 of the control apparatus 50 determines if the respective pieces of information are received from the input device 10 (Step S11). If the respective pieces of information are received from the input device 10, the CPU 51 of the control apparatus 50 integrates the acceleration values and the angular velocity values out of the respective pieces of received information. As a result, the CPU 51 obtains the travel distance and the rotational amount of the input device 10. The CPU 51 controls the control target 60b (Step S12). Note that, in Step S12, the CPU 51 of the control apparatus 50 may further execute calculation of the respective pieces of received information, and may execute process to improve accuracy of controlling the control target 60b.

For example, the control target 60b is a three-dimensionally displayed character image. In this case, in Step S12, the CPU 51 causes the character image to travel three-dimensionally and rotates the character image three-dimensionally based on information such as the travel distance and the rotational amount of the input device 10. Further, the CPU 51 causes the character image to execute particular movement (for example, jump, crouch, laugh, anger, etc.) based on information on grip strength and information of a force-applied position. Note that how to control the control target 60b based on information on travel distance, rotational amount, grip strength, and a force-applied position, is not specifically limited.

A user moves the input device 10, rotates the input device 10, grips the input device 10 more tightly, or presses a particular position of the input device 10 hard, while griping the input device 10 with force equal to or larger than predetermined force. As the result of process shown in FIGS. 8A and 8B, it is possible to move the control target 60b arbitrarily.

Meanwhile, a user wishes to (temporarily) stop controlling the control target 60b. In this case, the user weakens the grip strength when he grips the input device 10. A user weakens the grip strength when he grips the input device 10, and the grip strength falls below the predetermined force. Then, the movable parts 12b of the tactile switches 12 and the shell part 22 (plates 25) of the input device main body 20 move in directions that they depart from the center of the input device 10. When the movable parts 12b of the tactile switches 12 move in directions that they depart from the center of the input device 10, the click feeling generating mechanisms generate click feeling.

The input device 10 returns the response, i.e., click feeling, whereby the input device 10 is capable of appropriately returning a response to intention of a user to stop controlling the control target 60b. Then, a user is capable of easily recognizing, with the click feeling, that control of the control target 60b is stopped. When the movable parts 12b of the tactile switches 12 move in directions that they depart from the center of the input device 10, click feeling is generated. In addition, the switch mechanisms of the tactile switches 12 stop outputting signals. As a result, the tactile switches 12 stop inputting signals in the CPU 11 (Step S1, No), and the control target 60b stops moving.

In this manner, a user grips the input device 10 with force equal to or larger than the predetermined force, and weakens the grip strength when he grips the input device 10. As a result, the user is capable of arbitrarily selecting one of reflecting operation (operation in space, operation based on grip strength) of the input device 10 in control of the control target 60b and not reflecting operation of the input device 10 in control of the control target 60b.

Further, the click feeling generating mechanisms of the tactile switches 12 of the input device 10 are capable of appropriately returning a response to intention of a user to start to control the control target 60b. Then, a user is capable of easily recognizing, with the click feeling, that control of the control target 60b is started. Further, the click feeling generating mechanisms are capable of returning a response, i.e., click feeling, to a user immediately because the click feeling generating mechanisms return a response, i.e., click feeling, without using the CPU.

Further, the input device 10 is capable of rapidly returning a response, i.e., click feeling, whereby the input device 10 is capable of returning a response to intention of a user to stop controlling the control target 60b. Then, a user is capable of easily recognizing, with the click feeling, that control of the control target 60b is stopped.

(Operational Example of Input Device)

Next, a control example of the control target 60b by using the input device 10 will be described.

Figure 9:
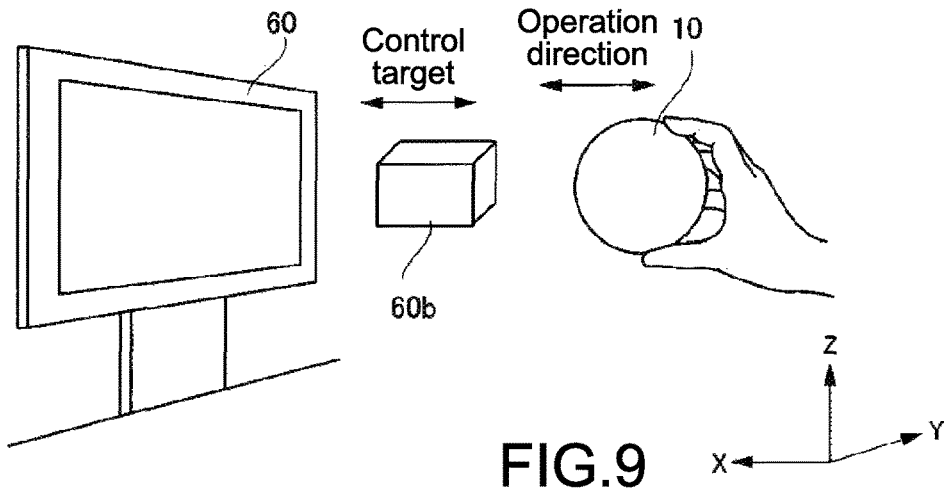
FIG. 9 is an explanatory diagram showing a control example of a control target, which is three-dimensionally displayed, in a case where a user moves the input device according to the embodiment of the present disclosure in the depth direction of the display.

FIG. 9 is an explanatory diagram showing a control example of the control target 60b, which is three-dimensionally displayed, in a case where a user moves the input device 10 in the depth direction of the display.

Let's assume that a user moves his hand, which holds the input device 10, in a direction (X direction) toward the display apparatus 60. Then, the control target 60b is displayed such that the control target 60b moves in the depth direction (X direction) of the display of the display apparatus 60, similar to the movement of the input device 10. This movement is expressed by means of a 3D image due to trick of the eye. The motion axes of the control target 60b include not only X direction of FIG. 9 but also YZ directions. The motion axes of the control target 60b further include oblique directions, which are obtained by synthesizing the three axes. Because of this, the control target 60b moves front/back/left/right/up/down together with front/back/left/right/up/down movement of the input device 10 irrespective of griping mode of the input device 10.

Figure 10:
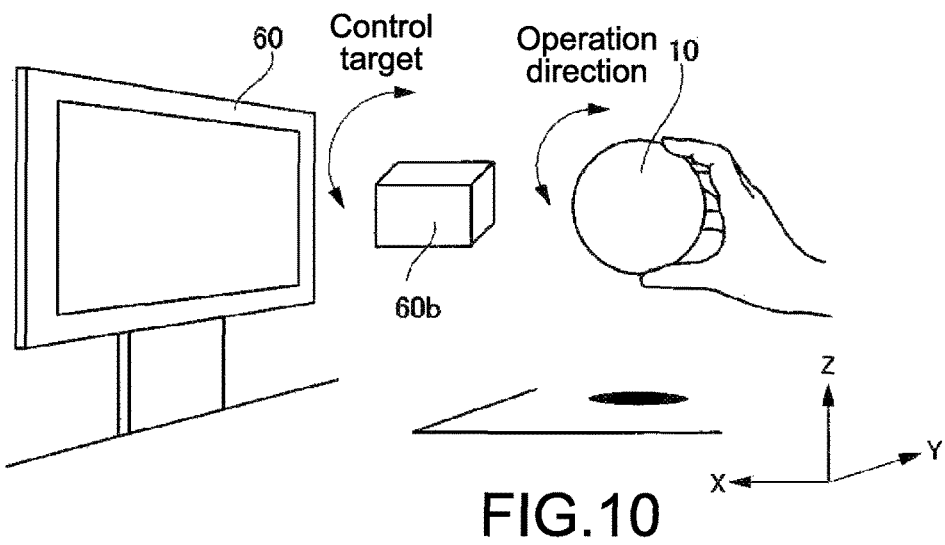
FIG. 10 is an explanatory diagram showing a control example of the control target, which is three-dimensionally displayed, in a case where a user rotates the input device according to the embodiment of the present disclosure.

FIG. 10 is an explanatory diagram showing a control example of the control target 60b, which is three-dimensionally displayed, in a case where a user rotates the input device 10.

Similar to FIG. 9, if a user rotates the input device 10 around Y axis, the control target 60b also rotates around Y axis. In this case also, movement of the control target 60b does not depend on holding direction of the input device 10. If a user rotates the input device 10 around XYZ axes, the control target 60b is displayed such that the control target 60b rotates around XYZ axes, irrespective of holding mode of the input device 10 by a user. Further, the rotational axes include not only Y direction of FIG. 10. The control target 60b is capable of rotating around XZ directions in the same way. The rotational axes further include oblique directions, which are obtained by synthesizing the three axes.

Figure 11:
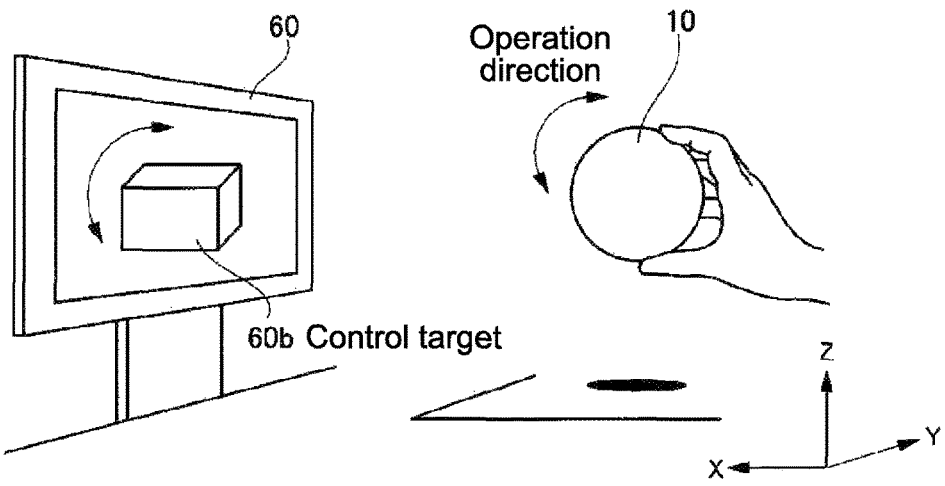
FIG. 11 is an explanatory diagram showing a control example of the control target, which is two-dimensionally displayed, in a case where a user rotates the input device according to the embodiment of the present disclosure.

FIG. 11 is an explanatory diagram showing a control example of the control target 60b, which is two-dimensionally displayed, in a case where a user rotates the input device 10.

The control target 60b shown in FIG. 9 or FIG. 10 is a 3D image due to trick of the eye. However, as shown in FIG. 11, it is possible to control the 2D-image control target 60b having depth information in the same way. In this case, similar to the control shown in FIG. 9 and FIG. 10, a user moves/rotates the input device 10, which is gripped with his hand, in/around XYZ axes. Such travel/rotation control is reflected in movement of the control target 60b, which is two-dimensionally displayed.

Next, with reference to FIG. 12 and FIG. 13, definitions of coordinate systems and axes will be described. The coordinate systems and the axes are used when mathematical formulae (described below) are described.

Figure 12:
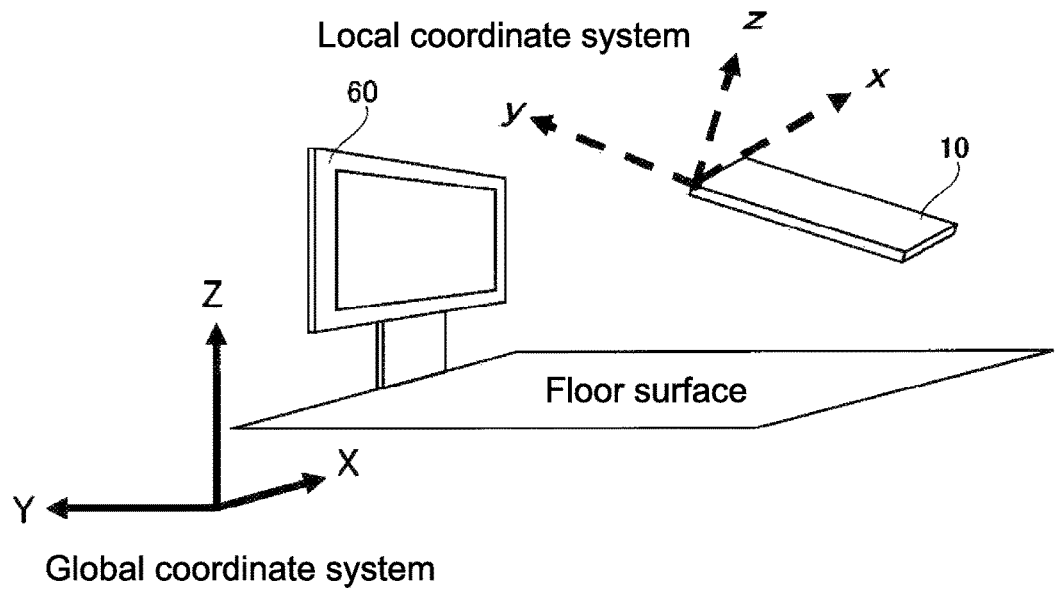
FIG. 12 is an explanatory diagram showing definitions of a global coordinate system and a local coordinate system according to the embodiment of the present disclosure.

FIG. 12 is an explanatory diagram showing definitions of the global coordinate system and the local coordinate system.

Hereinafter, the coordinate system having a plane in parallel with a floor surface is expressed by the global coordinate system X, Y, Z (capital letters). The coordinate system specific to the input device 10 is expressed by the local coordinate system x, y, z (italic small letters). Further, the global coordinate system is used for a coordinate, which specifies the position of the control target 60b displayed on the display of the display apparatus 60. For example, the vertical direction of the display is referred to as Z axis, the lateral direction of the display is referred to as X axis, and the depth direction of the display is referred to as Y axis. Further, the local coordinate system is used for a coordinate, which specifies the input device 10. The front direction of the input device 10 is referred to as y axis, the lateral direction of the input device 10 is referred to as x axis, and the thickness direction of the input device 10 is referred to as z axis.

Figure 13:
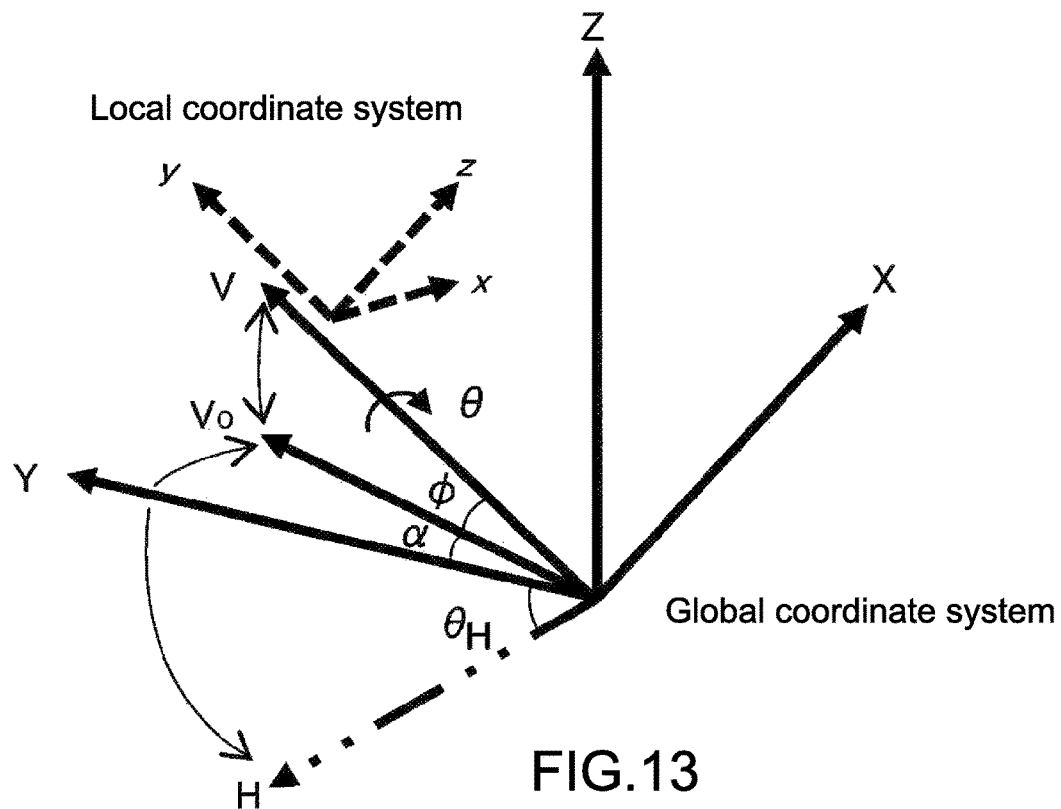
FIG. 13 is a line diagram showing relation between the local coordinate system and the global coordinate system according to the embodiment of the present disclosure.

FIG. 13 is a line diagram showing relation between the local coordinate system and the global coordinate system.

Here, Y axis of the global coordinate system faces the magnetic north orientation N. It means that the display of the display apparatus 60 faces north. A vector V is a vector showing the direction of the input device 10, and is in parallel with y axis of the local coordinate system. A vector $V_0$ is obtained by projecting the vector V on the XY plane (horizontal plane (floor surface)), and is a vector on the XY plane. An orientation angle alpha corresponds to an angle formed by Y axis and the vector $V_0$. A pitch angle phi corresponds to an angle formed by the vector V and the vector $V_0$, and is a rotation angle around x axis of the local coordinate. A roll angle theta is an angle around y axis on the xy plane of the local coordinate, and corresponds to an intersection angle of the yZ plane and the yz plane. A vector H is a vector indicating the geomagnetic direction, and faces the magnetic pole N.

A geomagnetic depression/elevation angle $theta_H$ is an angle formed by the XY horizontal plane and the geomagnetic direction, and corresponds to an angle formed by Y axis and the vector H.

Figure 14:
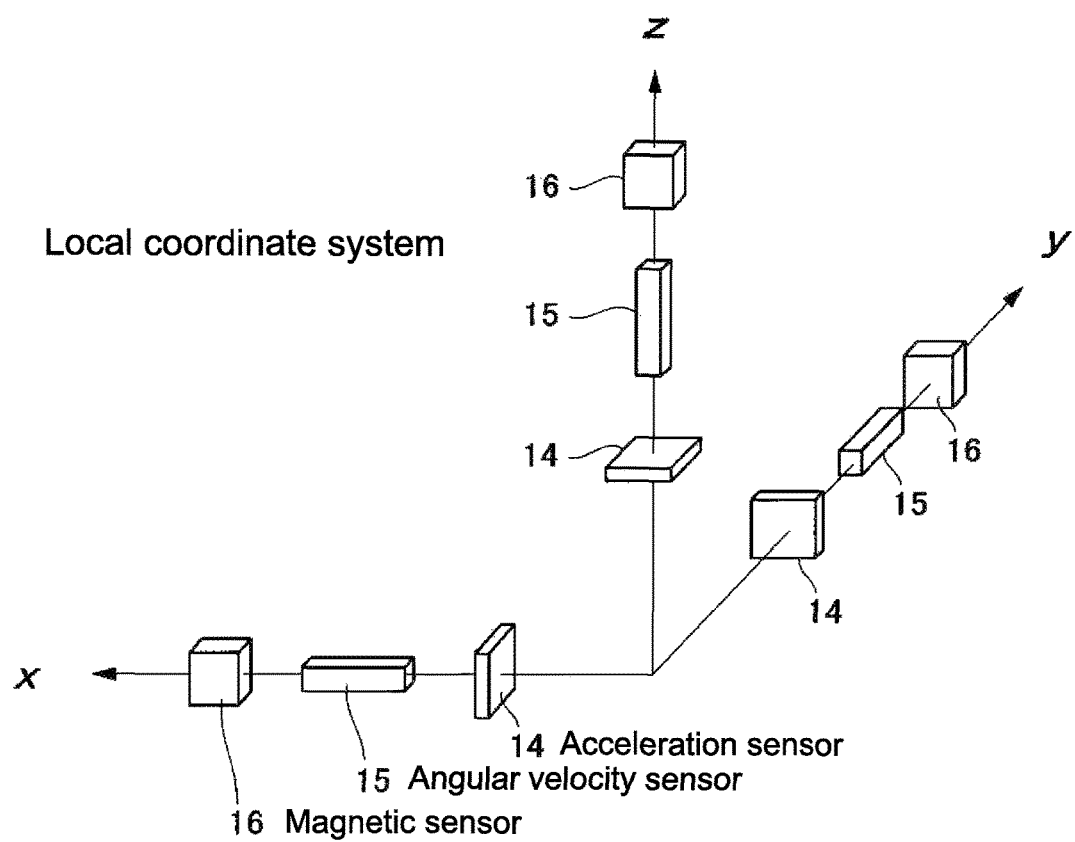
FIG. 14 is an explanatory diagram showing an example of x, y, z axes of acceleration sensors, angular velocity sensors, and magnetic sensors mounted on the input device according to the embodiment of the present disclosure.

FIG. 14 is an explanatory diagram showing an example of x, y, z axes of the acceleration sensors 14, the angular velocity sensors 15, and the magnetic sensors 16 mounted on the input device 10.

FIG. 14 shows that the acceleration sensor 14, the angular velocity sensor 15, and the magnetic sensor 16 are arranged on each of xyz axes of the local coordinate system. That is, the three acceleration sensors 14, the three angular velocity sensors 15, and the three magnetic sensors 16 are arranged in the local coordinate system. Note that at least one acceleration sensor 14, at least one angular velocity sensor 15, and at least one magnetic sensor 16 may be provided.

Figure 15:
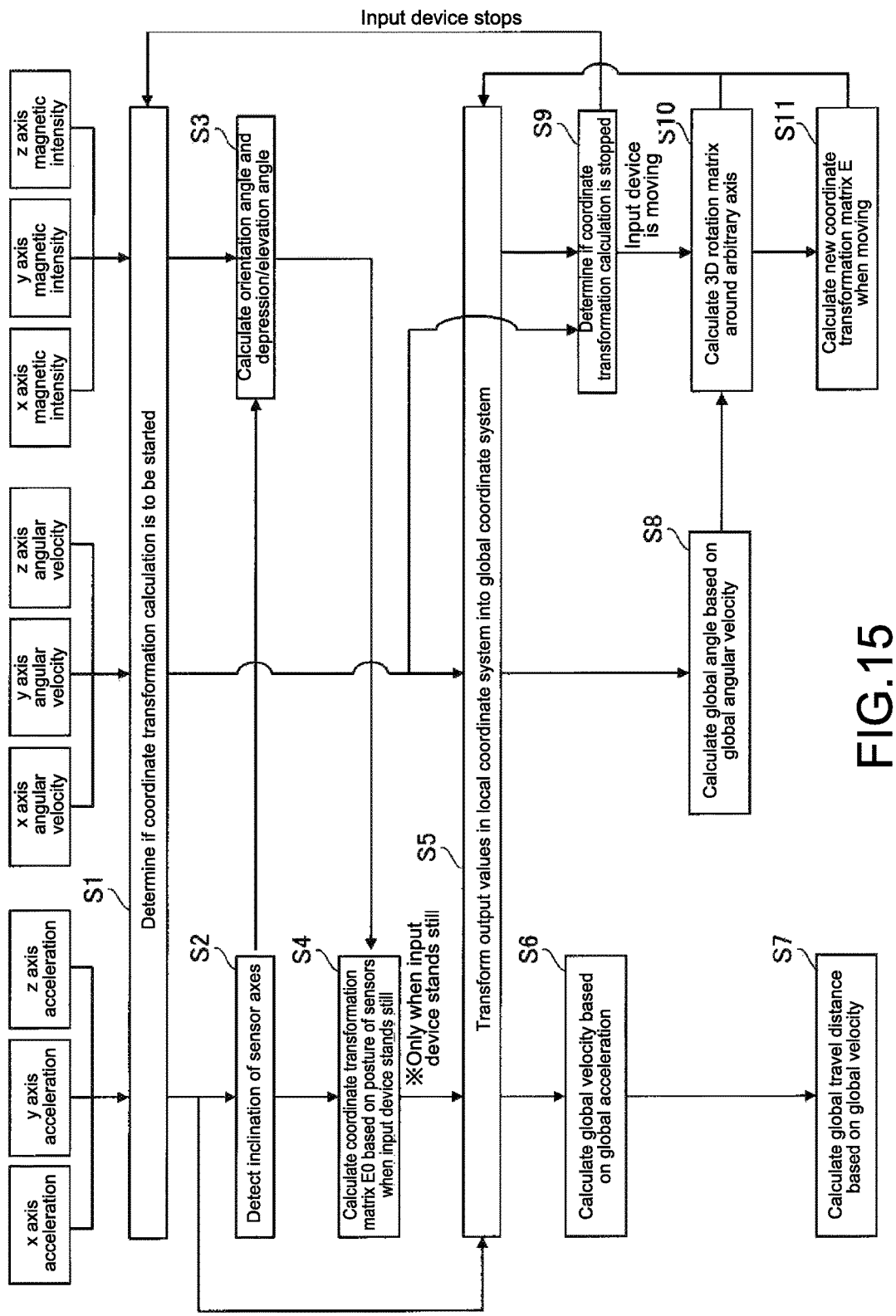
FIG. 15 is a flowchart showing an example of processing for conforming movement of the control target to operation of the input device based on displacement values output from the various sensors, in a case where the control apparatus according to the embodiment of the present disclosure receives the displacement values from the input device.

FIG. 15 is a flowchart showing an example of processing for conforming movement of the control target 60b to operation of the input device 10 based on displacement values output from the various sensors. The control apparatus 50 receives the displacement values from the input device 10.

This embodiment realizes the input device 10 capable of conforming movement of the control target 60b to behavior of a user irrespective of directionality of the input device 10, when the two-dimensionally or three-dimensionally displayed control target 60b is controlled. Here, the CPU 51 of the control apparatus 50 transforms displacement values of the local coordinate system, which are output from the various sensors, into the global coordinate system. In this case, calculation is executed as shown in the flowchart of FIG. 15. As a result, calculation error is minimized.

The display apparatus 60 complements displacement values received from the acceleration sensors 14, the angular velocity sensors 15, and the magnetic sensors 16 arranged on the respective axes of the local coordinate, to thereby execute calculation. Hereinafter, how to process displacement values obtained from the various sensors will be described specifically.

First, the CPU 51 receives acceleration values, angular velocity values, and magnetic values in xyz axes direction from the input device 10. The CPU 51 determines if the input device 10 starts moving such as travel or rotation (Step S1). Then, the CPU 51 determines whether to proceed to the subsequent calculation processing.

The CPU 51 determines if the input device 10 starts moving or not as follows. Displacement values, which are output from the acceleration sensors 14 arranged on the local coordinate x, y, z axes, are referred to as $X_{accl}$, $Y_{accl}$, and $Z_{accl}$, respectively. In this case, the following mathematical formula (1) expresses acceleration.

$$\sqrt{X_{accl}^2 + Y_{accl}^2 + Z_{accl}^2} = \text{constant} \quad (1)$$

Here, whether the input device 10 moves or not is determined based on whether the acceleration is equal to the constant 1 (G) or not. That is, if acceleration obtained based on the mathematical formula (1) is equal to 1 (G), it is determined that the input device 10 moves.

If the mathematical formula (1) is not satisfied, it is understood that movement acceleration is applied to the input device 10 in addition to gravity acceleration. As a result, the CPU 51 determines that the input device 10 starts moving. Note that predetermined constants $A_1$, $A_2$ may be defined, and the CPU 51 may determine if operation of the input device 10 is started or not based on the following mathematical formula (2).

$$A_1 < \sqrt{X_{accl}^2 + Y_{accl}^2 + Z_{accl}^2} < A_2 \quad (1)$$

Here, for example, the constant $A_1$ is 0.9 (G), and the constant $A_2$ is 1.1 (G). In this case, the CPU 51 does not determine that the input device 10 starts moving even if the input device 10 slightly travels. Further, the CPU 51 determines that the input device 10 starts moving if the mathematical formula (2) is not satisfied.

Note that the CPU 51 may determine if the input device 10 starts moving by using displacement values other than the above-mentioned mathematical formulae (1) and (2).

For example, displacement values $X_{gyro}$, $Y_{gyro}$, and $Z_{gyro}$ output from the angular velocity sensors 15 arranged on the local coordinate x, y, z axes are used. In this case, each of displacement values $X_{gyro}$, $Y_{gyro}$, and $Z_{gyro}$, is 0 when the input device does not move. In this case, the CPU 51 substitutes the displacement values $X_{gyro}$, $Y_{gyro}$, and $Z_{gyro}$, which are output from the angular velocity sensors 15 arranged on the local coordinate x, y, z axes, in $X_{accl}$, $Y_{accl}$, and $Z_{accl}$ of the mathematical formulae (1) and (2), respectively. As a result, the CPU 51 is capable of determining if the input device 10 moves or not. Further, the CPU 51 may substitute displacement values output from the magnetic sensors 16 in the mathematical formulae (1) and (2), to thereby determine if the input device 10 starts moving.

Further, the input device 10 may instruct the display apparatus 60 to start moving not by using displacement values output from the various sensors but by using operations input in the tactile switches 12 and the pressure-sensitive sensors 13. For example, let's assume that the tactile switches 12 are used. In this case, a user, who holds the input device 10, presses the tactile switches 12 when he wishes to start control. Then, the input device 10 may determine that the travel/rotation status is started, and may start calculation. As described above, a method of determining if movement is started or not may be realized by combining the various sensors and mechanisms.

Next, the CPU 51 determines inclination of the input device 10 held by a user in the global coordinate system based on gravity acceleration obtained from displacement values output from the acceleration sensors 14 (Step S2). Here, with reference to the respective coordinate systems of FIG. 13, an example of a method of calculating posture (local coordinate system) of the input device 10 with respect to the floor surface (global coordinate system) will be described.

First, a method of calculating the roll angle theta will be described. The roll angle theta is an angle around y axis on the local coordinate xy plane, and is an intersection angle of the yZ plane and the yz plane. The CPU 51 calculates the roll angle theta based on acceleration values in the local coordinate system received from the input device 10. The input device 10 faces the display apparatus 60, and rotates by the roll angle theta. Here, A is indicative of the displacement value output from the acceleration sensor 14 arranged on x axis with respect to gravity acceleration 1 G. $X_{accl}$ is indicative of the displacement value measured by the acceleration sensor 14 arranged on x axis. $Z_{accl}$ is indicative of the displacement value measured by the acceleration sensor 14 arranged on z axis. In this case, the roll angle theta is obtained based on the following mathematical formulae (3) and (4).

$$\theta = \begin{cases} -\arcsin(X_{accl}/A) & X_{accl} < 0, Z_{accl} > 0 \\ 180 + \arcsin(X_{accl}/A) & X_{accl} < 0, Z_{accl} < 0 \\ 180 + \arcsin(X_{accl}/A) & X_{accl} > 0, Z_{accl} < 0 \\ 360 - \arcsin(X_{accl}/A) & X_{accl} > 0, Z_{accl} > 0 \end{cases} \quad (3)$$

Here, as shown in the mathematical formula (3), different mathematical formulae are prepared depending on positive/negative sensor displacement values $X_{accl}$ and $Z_{accl}$. As a result, it is possible to express the roll angle theta in the system of 0 to 360 degrees. However, the range of the function arcsin(x) is $-1<x<1$. So, when the acceleration sensors 14 are affected by noise and the like, calculation error may occur infrequently based on the mathematical formula (3). In this case, as shown in the following mathematical formula (4), the function arctan(x) is used. The range of the function arctan(x) is $-\infty<x<\infty$. As a result, calculation error may not occur. Note that the mathematical formula (3) and the mathematical formula (4) may be used depending on limitation of the range, calculation accuracy of posture to be controlled, and the like.

$$\theta = \begin{cases} \arctan\left(\frac{-X_{accl}}{Z_{accl}}\right) & X_{accl} < 0, Z_{accl} > 0 \\ 180 + \arctan\left(\frac{-X_{accl}}{Z_{accl}}\right) & X_{accl} < 0, Z_{accl} < 0 \\ -180 + \arctan\left(\frac{-X_{accl}}{Z_{accl}}\right) & X_{accl} > 0, Z_{accl} < 0 \\ \arctan\left(\frac{-X_{accl}}{Z_{accl}}\right) & X_{accl} > 0, Z_{accl} > 0 \end{cases} \quad (4)$$

Next, a method of calculating the pitch angle phi will be described. The pitch angle phi corresponds to an angle formed by the vector V and the vector $V_0$, and is a rotation angle around x axis of the local coordinate. The CPU 51 calculates the pitch angle phi in the local coordinate system with respect to the global coordinate system based on the acceleration values and the gravity acceleration received from the input device 10. Here, B is indicative of the displacement value with respect to gravity acceleration 1 G output from the acceleration sensor 14 arranged on y axis. $Y_{accl}$ is indicative of the measured displacement value output from the acceleration sensor 14 arranged on y axis. $Z_{accl}$ is indicative of the displacement value output from the acceleration sensor 14 arranged on z axis. In this case, the mathematical formula (5) expresses the pitch angle phi.

$$\varphi = \begin{cases} 360 + \arcsin(Y_{accl}/B) & Y_{accl} < 0, Z_{accl} > 0 \\ 180 - \arcsin(Y_{accl}/B) & Y_{accl} < 0, Z_{accl} < 0 \\ 180 - \arcsin(Y_{accl}/B) & Y_{accl} > 0, Z_{accl} < 0 \\ \arcsin(Y_{accl}/B) & Y_{accl} > 0, Z_{accl} > 0 \end{cases} \quad (5)$$

$$\varphi = \begin{cases} -\arctan\left(\frac{-Y_{accl}}{\sqrt{X_{accl}^2 + Z_{accl}^2}}\right) & Y_{accl} < 0, Z_{accl} > 0 \\ -180 + \arctan\left(\frac{-Y_{accl}}{\sqrt{X_{accl}^2 + Z_{accl}^2}}\right) & Y_{accl} < 0, Z_{accl} < 0 \\ 180 + \arctan\left(\frac{-Y_{accl}}{\sqrt{X_{accl}^2 + Z_{accl}^2}}\right) & Y_{accl} > 0, Z_{accl} < 0 \\ -\arctan\left(\frac{-Y_{accl}}{\sqrt{X_{accl}^2 + Z_{accl}^2}}\right) & Y_{accl} > 0, Z_{accl} > 0 \end{cases} \quad (6)$$

Further, similar to the above-mentioned mathematical formulae (3) and (4), the function arcsin(x) of the mathematical formula (5) may not be used in order to broaden the range. Instead, the function arctan(x) of the mathematical formula (6) may be used. As a result, calculation error may not occur. Similar to the mathematical formulae (3) and (4), the mathematical formulae (5) and (6) may be used depending on limitation of the range, calculation accuracy of posture to be controlled, and the like. The CPU 51 is capable of obtaining the roll angle theta and the pitch angle phi of the input device 10 based on the mathematical formula (3) to the mathematical formula (6).

Next, the CPU 51 obtains an orientation angle and a geomagnetic depression/elevation angle based on the roll angle theta and the pitch angle phi of the input device 10, and based on magnetic intensities of the respective local coordinate axes (Step S3). The roll angle theta and the pitch angle phi are obtained based on the above-mentioned calculation. The magnetic intensities are obtained from the magnetic sensors 16. As a result, inclination of the input device 10 to the display apparatus 60 is determined.

First, a method of calculating the orientation angle alpha will be described. $X_{mag}$, $Y_{mag}$, and $Z_{mag}$ are indicative of the displacement values output from the magnetic sensors 16 on xyz axes of the local coordinate system, respectively. $X_H$, $Y_H$, and $Z_H$ are indicative of values obtained by projecting resultant vectors of displacement values, which are output from the magnetic sensors 16, to the global coordinate XY plane. In this case, the mathematical formula (7) is derived based on the above-mentioned roll angle theta and pitch angle phi.

$$X_H = X_{mag}\cos(\theta) + Y_{mag}\sin(\theta)\sin(\varphi) + Z_{mag}\cos(\varphi)\sin(\theta) \quad (7)$$

$$Y_H = Y_{mag}\cos(\varphi) - Z_{mag}\sin(\varphi)$$

$$Z_H = X_{mag}\sin(\theta) - Y_{mag}\sin(\varphi)\cos(\theta) - Z_{mag}\cos(\varphi)\cos(\theta)$$

$$\alpha = \begin{cases} \arctan\dfrac{Y_H}{X_H} - 90 & X_H > 0 \\ \arctan\dfrac{Y_H}{X_H} - 270 & X_H < 0 \end{cases}$$

The CPU 51 obtains an angle (orientation) formed by the magnetic north (global coordinate system Y axis direction) and the front direction of the input device 10 based on the mathematical formula (7). The orientation is transformed to an angle formed by the control target 60b and the input device 10. The transformation method will be described later. Here, a method of calculating the geomagnetic depression/elevation angle $\theta_H$ will be described. The geomagnetic depression/elevation angle $\theta_H$ is an angle formed by the XY horizontal plane and the geomagnetic direction, and corresponds to an angle formed by Y axis and the vector H. The CPU 51 calculates the geomagnetic depression/elevation angle $\theta_H$ of geomagnetism in the global coordinate system and the orientation angle of the input device 10 to the display apparatus 60 based on the magnetic values in the local coordinate system received from the input device 10. The geomagnetic depression/elevation angle $\theta_H$ is calculated based on the mathematical formula (8), which uses the above-mentioned $X_H$, $Y_H$, and $Z_H$.

$$\theta_H = \arctan\dfrac{Z_H}{\sqrt{X_H + Y_H}} \quad (8)$$

Next, another example of calculating the geomagnetic depression/elevation angle $\theta_H$ will be described. The latitude phi and the longitude lambda of the position of the input device 10 are previously obtained. Alternatively, the latitude phi and the longitude lambda are obtained by a GPS or the like. In those cases, $\theta_H$ may also be obtained based on the following mathematical formula (9).

$$\theta_H = 51°03'.804 + 73'745\Delta\phi - 9'472\Delta\lambda - 0.771\Delta\phi^2 - 0'.459\Delta\lambda\Delta\phi + 0'.359\Delta\lambda^2 \quad (9)$$

where $\Delta\phi = \phi - 37° N$ $\Delta\lambda = \lambda - 138° E$

Note that the mathematical formula (9) is obtained by approximating the distribution of the geomagnetic depression angle $\theta_H$ by the quadratic expression of latitude and longitude. The mathematical formula (9) is changed depending on movement of the magnetic pole. So the mathematical formula (9) may be updated on a regular basis. As a result, the mathematical formula (9) may be accurate always. Further, a value obtained by primary approximation of the first and second terms of the mathematical formula (9) may be used, depending on accuracy required for obtaining the geomagnetic depression/elevation angle $\theta_H$.

Next, the CPU 51 executes primary processing for transforming the acceleration and the angular velocity detected in the local coordinate system into the global coordinate system, based on the orientation angle obtained from the above-mentioned calculation and based on displacement values output from the acceleration sensors 14 (Step S4). This processing corresponds to calculation processing in a state where the input device 10 stands still.

First, with reference to FIG. 16 to FIG. 18, how to define axes will be described. After that, the calculation processing of Step S4 will be described.

Figure 16:
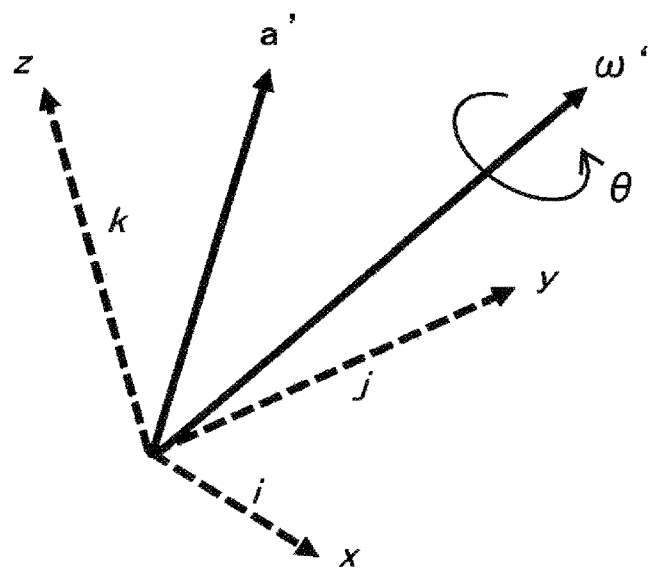
FIG. 16 is an explanatory diagram showing an example of acceleration a' and angular velocity omega' detected in the local coordinate system according to the embodiment of the present disclosure.

FIG. 16 is an explanatory diagram showing an example of acceleration a' and angular velocity omega' detected in the local coordinate system.

Figure 17:
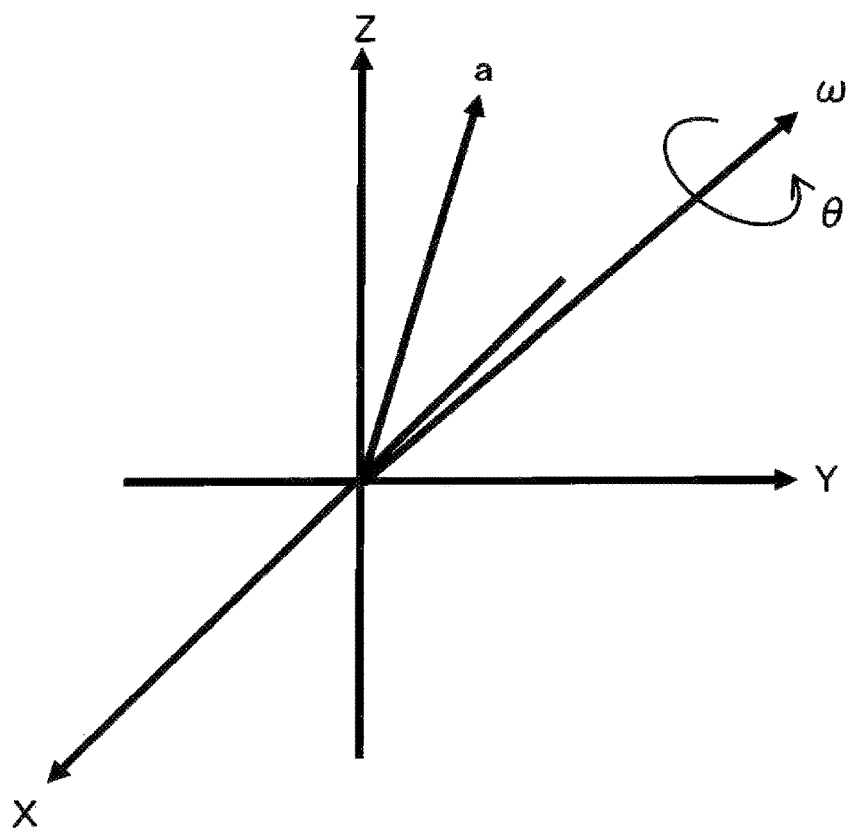
FIG. 17 is an explanatory diagram showing an example of acceleration a and angular velocity omega transformed into the global coordinate system according to the embodiment of the present disclosure.

FIG. 17 is an explanatory diagram showing an example of acceleration a and angular velocity omega transformed into the global coordinate system.

Figure 18:
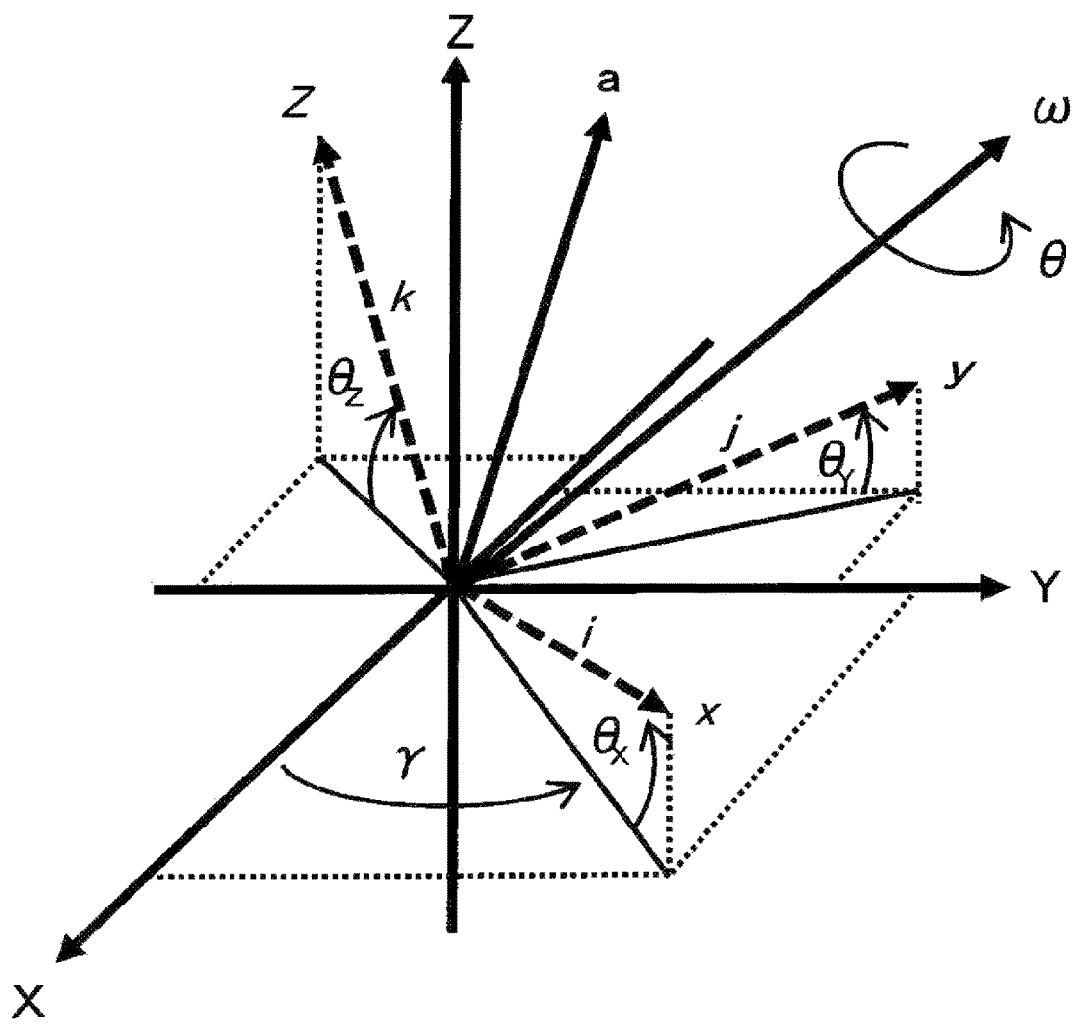
FIG. 18 is an explanatory diagram showing an example of unit vectors i, j, k in the global coordinate system according to the embodiment of the present disclosure.

FIG. 18 is an explanatory diagram showing an example of unit vectors i, j, k in the global coordinate system.

The CPU 51 integrates the acceleration a' and the angular velocity omega' detected in the local coordinate system of FIG. 16. As a result, the CPU 51 obtains velocity, travel distance, and a rotation angle of the input device 10. In this case, it is necessary to transform the acceleration a' and the angular velocity omega' in the local coordinate into the acceleration a and the angular velocity omega in the global coordinate of FIG. 17.

In this case, first, as shown in FIG. 16, unit vectors of the local coordinate system axes x, y, z are referred to as i, j, k, respectively. Further, angles formed by the unit vector i, j, k and the global coordinate XY plane are referred to as $\theta_x$, $\theta_y$, $\theta_z$, respectively (see FIG. 18).

An angle gamma of FIG. 18 is formed by the display apparatus 60, on which the control target 60b is displayed, and the input device 10. Here, in FIG. 13, the display apparatus 60, on which the control target 60b is displayed, is on the global coordinate Y axis, and faces the magnetic north direction. However, from a practical point of view, the display apparatus 60 is not always arranged such that the display apparatus 60 faces the magnetic north. In view of this, the angle gamma formed by the display apparatus 60, on which the control target 60b is displayed, and the input device 10 is defined by the following mathematical formula (10) where C is indicative of the orientation, in which the display apparatus 60 is arranged, and where the orientation angle alpha of the input device 10 obtained based on the mathematical formula (7) is used.

$$\gamma = \alpha - C \quad (10)$$

Here, the acceleration a' and the angular velocity omega' in the local coordinate system of FIG. 16 may be expressed by the acceleration a and the angular velocity omega in the global coordinate system of FIG. 17 based on the following mathematical formula (11).

$$\gamma = E_n a'$$

$$\omega = E_n \omega'$$

$$E_n = [i, j, k] \quad (11)$$

Here, a matrix $E_n$ is a transform matrix including reference unit vectors i, j, k in the local coordinate system as elements. Further, the vectors are calculated based on $theta_x$, $theta_y$, $theta_z$, and gamma.

First, according to the present flow, the acceleration a and the angular velocity omega are calculated in a state where the input device 10 stands still. So, $theta_x$, $theta_y$, $theta_z$ are expressed by the following mathematical formula (12). In the mathematical formula (12), $alpha_x$, $alpha_y$, $alpha_z$ are indicative of the displacement values of the acceleration sensors 14 arranged on the local coordinate axes, respectively.

$$\theta_x = \arcsin \alpha_x/g \quad \theta_y = \arcsin \alpha_y/g \quad \theta_z = \arcsin \alpha_z/g \quad (12)$$

In this case, the acceleration g of the acceleration sensors 14 is expressed by the following mathematical formula (13) using $alpha_x$, $alpha_y$, $alpha_z$.

$$g = \sqrt{\alpha_x^2 + \alpha_y^2 + \alpha_z^2} \quad (13)$$

The acceleration g of the mathematical formula (13) is a resultant vector in a case where the three-axes acceleration sensors 14 stand still. Only gravity acceleration is output. In view of this, the acceleration g is about 9.8 m/s². Further, the coordinate transformation matrix $E_0$ including the reference unit vectors i, j, k as elements in a case where t=0 (when input device 10 stands still) is obtained based on the following mathematical formula (14) using $theta_x$, $theta_y$, $theta_z$, and gamma. $theta_x$, $theta_y$, $theta_z$ are obtained based on the mathematical formula (12). gamma is indicative of the angle formed by the input device 10 and the display apparatus 60, which is obtained based on the mathematical formula (10).

$$i = \begin{pmatrix} \cos\gamma\cos\theta_x \\ \sin\gamma\cos\theta_x \\ \sin\theta_x \end{pmatrix} \quad (14)$$

$$E_0 = [i, j, k]_0 \quad i = \begin{pmatrix} -\cos\gamma\tan\theta_x\sin\theta_y - \sin\gamma\frac{\sin\theta_z}{\cos\theta_x} \\ -\sin\gamma\tan\theta_x\sin\theta_y + \cos\gamma\frac{\sin\theta_z}{\cos\theta_x} \\ \sin\theta_y \end{pmatrix}$$

$$k = i \times j = \begin{pmatrix} \sin\gamma(\cos\theta_x\sin\theta_y + \tan\theta_x\sin\theta_x\sin\theta_y) - \cos\gamma\tan\theta_x\sin\theta_z \\ -\sin\gamma\tan\theta_x\sin\theta_z - \cos\gamma\frac{\sin\theta_y}{\cos\theta_x} \\ \sin\theta_z \end{pmatrix}$$

Next, the acceleration a' and the angular velocity omega' in the local coordinate are transformed into the acceleration a and the angular velocity omega in the global coordinate based on the coordinate transformation matrix $E_0$ obtained based on the above-mentioned calculation (Step S5).

The coordinate transformation matrix $E_0$ in a case where t=0 (when input device 10 stands still) is obtained based on the mathematical formula (14). In view of this, the acceleration $a'_0$ and the angular velocity $omega'_0$ in the local coordinate in a case where t=0 are transformed into the acceleration $a_0$ and the angular velocity $omega_0$ in the global coordinate based on the coordinate transformation matrix $E_0$. The following mathematical formula (15) is obtained based on the mathematical formula (11).

$$a_0 = E_0 a'_0 = E_0 \begin{bmatrix} a'_{x0} \\ a'_{y0} \\ a'_{z0} \end{bmatrix} = \begin{bmatrix} a_{x0} \\ a_{y0} \\ a_{z0} \end{bmatrix} \quad (15)$$

$$\omega_0 = E_0 \omega'_0 = E_0 \begin{bmatrix} \omega'_{x0} \\ \omega'_{y0} \\ \omega'_{z0} \end{bmatrix} = \begin{bmatrix} \omega_{x0} \\ \omega_{y0} \\ \omega_{z0} \end{bmatrix} \quad (16)$$

Here, $a'_{x0}$, $a'_{y0}$, $a'_{z0}$, $omega'_{x0}$, $omega'_{y0}$, $omega'_{z0}$ in the mathematical formulae (15) and (16) are indicative of displacement values of the acceleration sensors 14 and displacement values of the angular velocity sensors 15 arranged on xyz axes of the local coordinate system, respectively. Further, $a_{x0}$, $a_{y0}$, $a_{z0}$, $omega_{x0}$, $omega_{y0}$, $omega_{z0}$ are indicative of acceleration and angular velocity in XYZ axes of the global coordinate system, respectively.

Next, the CPU 51 transforms the acceleration a and the angular velocity omega in the global coordinate system, which are obtained based on the above-mentioned calculation, into travel distance and rotation angles in the global coordinate system, respectively (Steps S6 to S8). The calculation includes, for example, integral processing. Further, the CPU 51 calculates velocity and travel distance of the control target 60b in the global coordinate system based on the acceleration of the control target 60b in the global coordinate system. Further, the CPU 51 calculates angles that the control target 60b travels in the global coordinate system based on angular velocity of the control target 60b in the global coordinate system. Note that, in FIG. 15, acceleration, velocity, travel distance, angular velocity, and an angle in the global coordinate system are referred to as global acceleration, global velocity, global travel distance, global angular velocity, and a global angle, respectively.

The CPU 51 calculates the acceleration $a_{X0}$, $a_{Y0}$, $a_{Z0}$ and the angular velocity $omega_{X0}$, $omega_{Y0}$, $omega_{Z0}$ of the input device 10 in XYZ axes of the global coordinate, respectively, based on the above-mentioned mathematical formulae (15) and (16). Further, processing in a case where t is not 0 (described below) is executed. As a result, the CPU 51 executes coordinate transformation every time the CPU 51 obtains displacement values from the various sensors, and obtains the acceleration $a_0$ and the angular velocity $omega_0$ of the input device 10 in each of XYZ axes of the global coordinate. Note that, in order to transform the acceleration $a_0$ and angular velocity $omega_0$ into the travel distance and the rotation angles of the input device 10, it is necessary to time-integrate the acceleration $a_0$ and the angular velocity $omega_0$.

As a time-integration method, various integral processing such as trapezoidal method, midpoint method, and Simpson method are used. The various integration methods will not be described in detail here.

Next, coordinate transformation (for example, t=0) is executed at arbitrarily timing after the input device 10 starts to move. After that, it is determined that if coordinate transformation of displacement values obtained from the various sensors (t=1) is successively executed or not at the next sampling timing (Step S9). As a result, it is understood that the input device 10 is moving or stops.

The acceleration $a_{X0}$, $a_{Y0}$, $a_{Z0}$, and the angular velocity $omega_{X0}$, $omega_{X0}$, $omega_{Z0}$ of the input device 10 in XYZ axes of the global coordinate are calculated, respectively, based on the mathematical formulae (15) and (16). $omega'_1$ is indicative of the angular velocity in the local coordinate system, which is detected by the angular velocity sensors 15 at the next sampling timing (t=1) after t=0. $omega'_{1x}$, $omega'_{1Y}$, $omega'_{1Z}$ are indicative of the respective elements. In this case, if the following mathematical formula

(17) is satisfied, then it means that the input device 10 is moving. In this case, the next step is calculated.

$$\|\omega'_1\| \neq 0 \quad (17)$$

$$\|w'_1\| = 0 \quad (18)$$

If the mathematical formula (18) is satisfied, then it means that the input device 10 is not moving and stops. In this case, the flow returns to the coordinate transformation calculation start determination processing (Step S1). In Step S1, the mathematical formula (1) is calculated.

Meanwhile, if the mathematical formula (17) is satisfied, the CPU 51 obtains a 3D rotation matrix $R^{omega\ theta}$ (Step S10). According to the 3D rotation matrix $R^{omega\ theta}$, the input device 10, which is determined that it is moving, rotates by the roll angle theta around the vector omega' of FIG. 16.

The input device 10 rotates by the roll angle theta around the vector omega' of FIG. 16 and FIG. 17. Let's assume that DELTAt is indicative of the sampling cycle of displacement values from the various sensors. In this case, the following mathematical formula (19) is satisfied.

$$\theta = \Delta t |\omega'| \quad (19)$$

Next, let's assume that lambda, mu, nu are indicative of elements of the unit vectors of the vector omega', respectively. In this case, the unit vectors are expressed by the following mathematical formula (20).

$$[\lambda \mu \nu]^T = \frac{\omega'}{\|\omega'\|} \quad (20)$$

According to the mathematical formulae (19) and (20), the 3D rotation matrix $R^{omega\ theta}$ is expressed by the following mathematical formula (21). According to the 3D rotation matrix $R^{omega\ theta}$, the input device 10 rotates by the roll angle theta around the vector omega' of FIG. 16.

$$R^{\omega\theta} = \begin{bmatrix} \cos\theta + \lambda^2(1-\cos\theta) & \lambda\mu(1-\cos\theta) - \nu\sin\theta & \nu\lambda(1-\cos\theta) + \mu\sin\theta \\ \lambda\nu(1-\cos\theta) + \nu\sin\theta & \cos\theta + \mu^2(1-\cos\theta) & \mu\nu(1-\cos\theta) - \lambda\sin\theta \\ \nu\lambda(1-\cos\theta) - \mu\sin\theta & \mu\nu(1-\cos\theta) + \lambda\sin\theta & \cos\theta + \nu^2(1-\cos\theta) \end{bmatrix} \quad (21)$$

Next, the CPU 51 calculates a coordinate transformation matrix (Step S11). According to the coordinate transformation matrix, acceleration and angular velocity of the input device 10 detected in the local coordinate system are transformed into the global coordinate system. Here, the input device 10 rotates by the roll angle theta around the vector omega'. It is determined that the input device 10 is moving based on the mathematical formula (17).

The coordinate transformation matrix En rotates by the roll angle theta around the vector omega'. In this case, the new coordinate transformation matrix $E_{n+1}$ is expressed by the following mathematical formula (22) using the 3D rotation matrix $R^{omega\ theta}$.

$$E_{n+1} = R^{\omega\theta} E_n \quad (22)$$

When the input device 10 is moving, the coordinate transformation matrix is updated at the sampling cycle based on the mathematical formula (22). Here, the CPU 51 updates the transformation matrix $E_n$ to the transformation matrix $E_{n+1}$ based on the angular velocity values in the local coordinate system received from the input device 10. The transformation matrix $E_n$ is used to transform angular velocity of the control target 60b in the local coordinate system into angular velocity in the global coordinate system. The $E_{n+1}$ is reflected in the mathematical formulae (15) and (16). As a result, it is possible to obtain acceleration and angular velocity in the global coordinate system.

(How to Obtain Parallax)

Here, the control target 60b is stereoscopically displayed in X axis of the global coordinate system as shown in FIG. 9 and FIG. 10. Such stereoscopic display is realized by correlating movement of the input device 10 in the global coordinate with parallax of an image displayed on the display apparatus 60.

Figure 19:
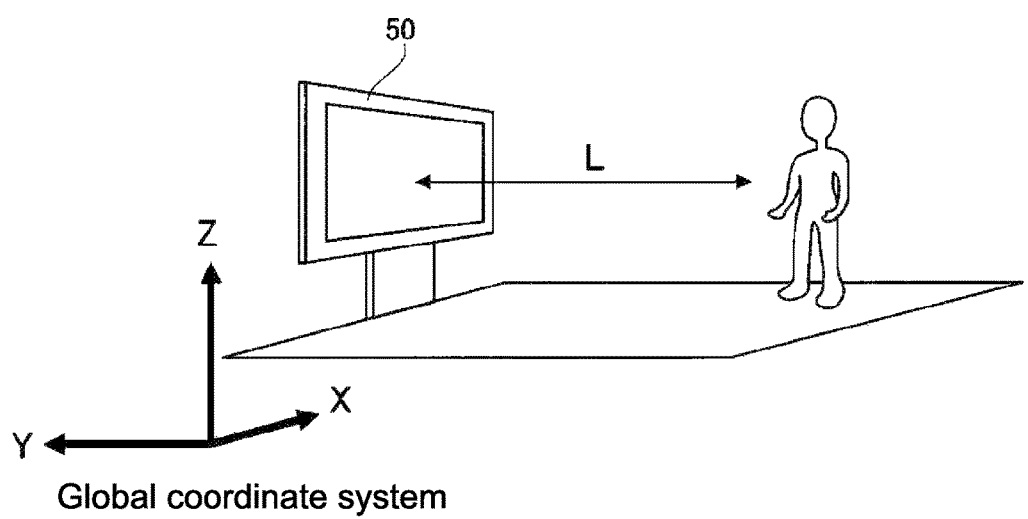
FIG. 19 is an explanatory diagram showing positional relation of a user and the display apparatus in the global coordinate system according to the embodiment of the present disclosure.

FIG. 19 is an explanatory diagram showing positional relation of a user and the display apparatus 60 in the global coordinate system.

Figure 20:
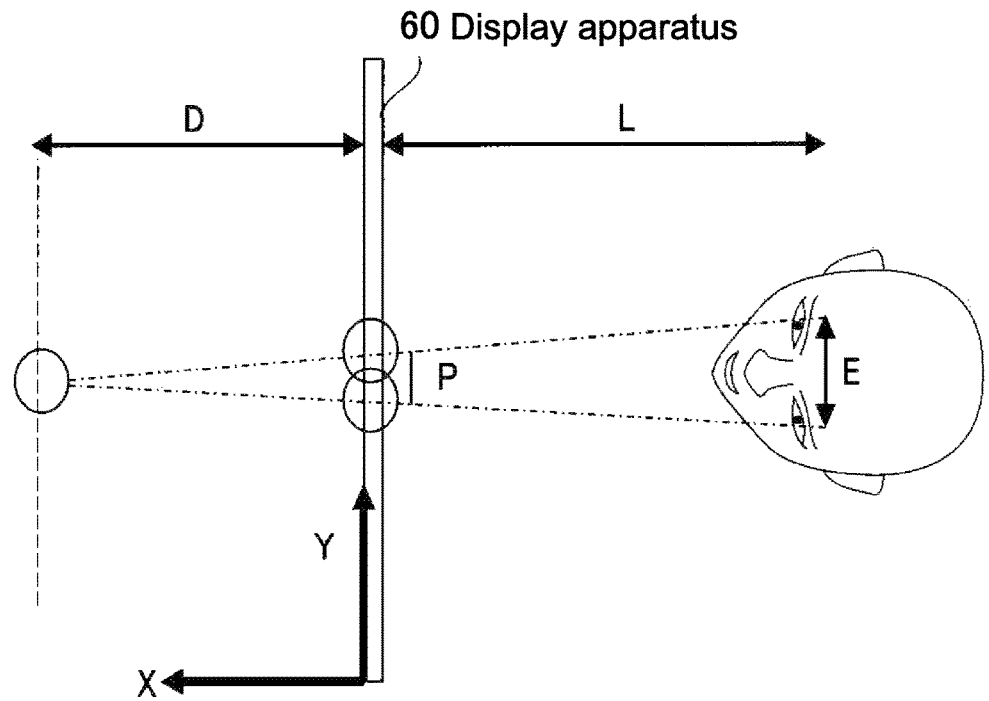
FIG. 20 is an explanatory diagram showing an example of user's parallax in addition to the positional relation of FIG. 19.

FIG. 20 is an explanatory diagram showing an example of user's parallax in addition to the positional relation of FIG. 19.

L is indicative of distance between a user, who operates the input device 10, and the display apparatus 60. P is indicative of image parallax of the display apparatus 60 as shown in FIG. 20. D is indicative of image depth. E is indicative of distance between the eyeballs of a user. In this case, the following mathematical formula (23) is satisfied.

$$D:P = (D+L):E \quad (23)$$

$$P = DE/D+L \quad (24)$$

This mathematical formula means the following situation. That is, the control target 60b is to be displayed as if the control target 60b depresses from the display apparatus 60 by 24 m (D=24 m) where E=65 mm and L=2 m, for example. In this case, P=6 cm. It means that the display image is to be displaced by 6 cm. Here, T is indicative of travel distance of the input device 10 in X axis of FIG. 20. In this case, as shown in the following mathematical formula (25), the image parallax P is adjusted by using the constant alpha. As a result, it is possible to control the control target 60b, which is a 3D image due to trick of the eye, by using the input device 10.

$$P = alpha T \quad (25)$$

Figure 21:
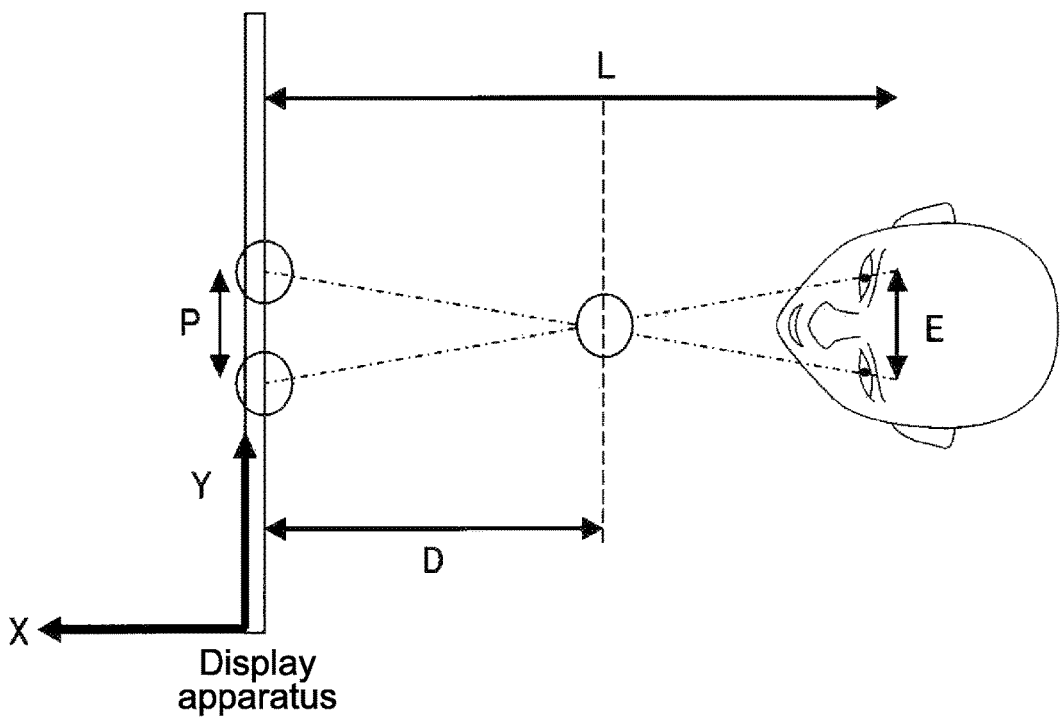
FIG. 21 is an explanatory diagram in a case where the control target according to the embodiment of the present disclosure is displayed as if the control target bursts from the display apparatus.

FIG. 21 is an explanatory diagram in a case where the control target 60b is displayed as if the control target 60b bursts from the display apparatus 60.

Also in this case, similar to the mathematical formulae (23) and (24), calculation is executed based on the following mathematical formulae (26) and (27).

$$D:P = (D-L):E \quad (26)$$

$$P = DE/D-L \quad (27)$$

The control target 60b is to be displayed such that the control target 60b bursts from the display apparatus 60 by 1.2 m (D=1.2 m) where E=65 mm and L=2 m, for example. In this case, P=10 cm. It means that the display image is to be displaced by 10 cm. Further, T is indicative of travel distance of the input device 10 in X axis of FIG. 21. In this case, the image parallax P is adjusted based on the constant alpha of the mathematical formula (25). As a result, it is possible to control the control target 60b, which is a 3D image due to trick of the eye, by using the input device 10.

As described above, the control system 100 according to this embodiment executes various kinds of numerical processing based on displacement values obtained from a plurality of sensors. In this case, a control target is displayed such that the control target moves to a position corresponding to displacement amounts in a first coordinate system based on a transformation matrix. The transformation matrix is used to transform displacement amounts of an input device in a second coordinate system into displacement amounts in the first coordinate system. As a result, a user is capable of naturally moving the control target by using an input device in a direction that the user wishes to control the control target. User-friendliness of an input device, which has no directionality, is improved.

Here, if the input device 10 executes the numerical processing, processing speed may be slow or calculation accuracy may be inadequate. Because of this, the input device 10 may execute only simple calculation, i.e., Step S1. Further, the CPU 51 may execute complicated calculation, i.e., Steps S2 to S11. Alternatively, the input device 10 only sends displacement values output from the various sensors. Further, the CPU 51 of the control apparatus 50 may execute complicated calculation.

Meanwhile, an operational integrated circuit having high throughput may be mounted on the input device 10, and the input device 10 may execute all the calculation. It may be arbitrarily selected whether the input device 10 executes numerical calculation processing or an apparatus different from the input device 10 executes numerical calculation processing depending on environment such as cost, chip size, and operational processing ability. Further, the signal transmission method may be realized by communication between apparatuses such as Zigbee (registered trademark) or Bluetooth (registered trademark), or by communication via the Internet.

Further, it is possible to conform movement of the control target 60b to behavior of a user irrespective of directionality of the input device 10, when the two-dimensionally or three-dimensionally displayed control target 60b is controlled.

By using the calculation method of the present disclosure, it is possible to minimize the gap between movement of the input device 10 and movement of the control target 60b. It is not necessary for a user to frequently change the direction of his gaze to check his hand, for example. As a result, the user is capable of controlling the control target 60b intuitively.

Further, the input device 10 is rotating, or a user's hand, which holds the input device 10, slightly shakes. In such a case, the input device 10 may move by small distance. Even in such a case, the input device 10 is capable of determining positional relation between the display apparatus 60 and the input device 10, and controlling the control target 60b by itself, because the input device 10 includes the angular velocity sensors 15.

2. Modification Examples

Configuration Example of Display Apparatus

Note that, in the above-mentioned embodiment, the control apparatus 50 controls movement display of the control target 60b displayed on the display apparatus 60. Alternatively, a display apparatus 70 may control movement display of the control target 60b by itself. Here, a configuration example of the display apparatus 70 will be described.

Figure 22A:
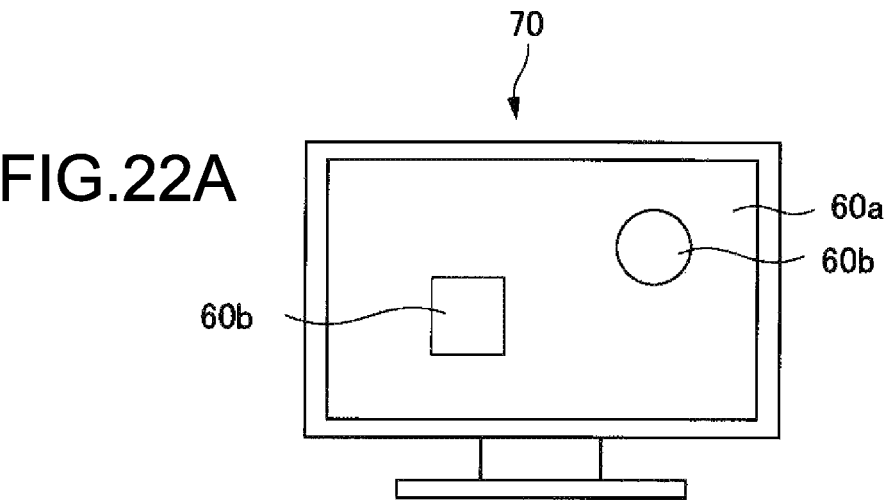
FIGS. 22A and 22B are block diagrams showing an internal configuration example of a display apparatus according to another embodiment of the present disclosure.
Figure 22B:
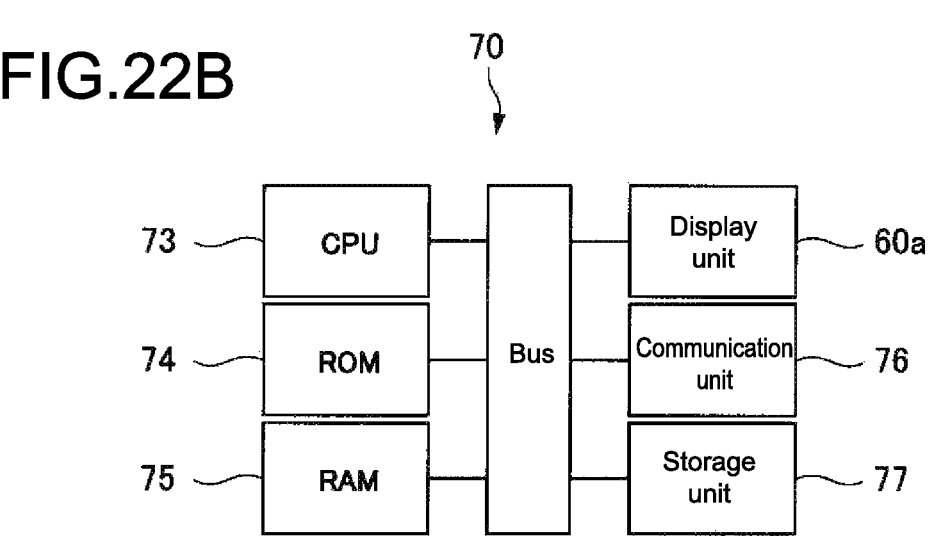

FIGS. 22A and 22B are block diagrams showing an internal configuration example of the display apparatus 70. FIG. 22A shows a configuration example of the control system 100'. FIG. 22B shows an internal configuration example of the display apparatus 70.

The display apparatus 70 includes the display unit 60a. The display apparatus 70 is an all-in one computer apparatus including a display, and has functions of a general computer apparatus. A circle icon and a square icon are displayed on the display unit 60a as the control targets 60b. Further, the input device 10 in an operable status is in front of the display apparatus 70 (FIG. 22A).

The display apparatus 70 includes the display unit 60a, a CPU 73, a ROM 74, a RAM 75, a communication unit 76, and a storage unit 77.

The ROM 74 is a nonvolatile memory, and stores various programs necessary for processing executed by the CPU 73. The RAM 75 is a volatile memory, and is used as a work area for the CPU 73.

The communication unit 76 includes an antenna (not shown) and the like, and receives various kinds of information sent from the input device 10. Further, the communication unit 76 is also capable of sending a signal to the input device 10. The CPU 73 executes processing of the respective units of the display apparatus 70, and executes control similar to the above-mentioned CPU 51 of the control apparatus 50. That is, the CPU 73 controls a control target, which is displayed on the display unit 60a, based on various kinds of information received from the sending/receiving circuit 17.

Further, the display apparatus 70 includes an operational unit (not shown). The operational unit is, for example, a keyboard. A user inputs setting such as initial setting and special setting by using the operational unit. The operational unit receives various instructions from a user, and outputs input signals to the CPU 73. As described above, the display apparatus 70 has an all-in-one configuration including the control apparatus 50 and the above-mentioned display apparatus 60. Because of this, the configuration of the control system 100' may be simplified.

Other Modification Examples

Further, the distance between the input device 10 and the display apparatus 60 may be arbitrarily set because the distance does not affect controlling performance.

For example, the input device 10 may be used as a remote control for controlling a robot arm, a crane, or the like. The robot arm, the crane, or the like, which moves in reality, may be displayed on the display apparatus 60.

Further, the control target 60b is a virtual object displayed on a display. It is possible to display and control the control target 60b irrespective of the kind of object. Because of this, even an inexperienced user, who is not used to a computer apparatus, is capable of controlling the control target 60b intuitively Further, the input device 10 has a spherical shape. Alternatively, the input device may have a shape other than a sphere. A shape having no directionality such as, for example, a regular polyhedron or a semiregular polyhedron may also be employed.

Further, the input device 10 is capable of using sensor data in nine axes. However, it is not always necessary to use sensor data of all the axes. Partial sensor data may be extracted to be used to control the control target 60b.

Further, hardware may execute the series of processing in the above-mentioned embodiment. Alternatively, software may execute the series of processing. The following computer may execute the series of processing. That is, programs configuring the software are installed in dedicated hardware of a computer. Alternatively, programs for executing various functions are installed in a computer. For example, programs configuring desired software may be installed in a general-purpose personal computer or the like, and the computer may execute the programs.

Further, a recording medium, in which program codes of software that realizes the functions of the above-mentioned embodiments are recorded, may be supplied to a system or an apparatus. Further, the system or a computer (or controller device such as CPU) of the apparatus may read out and execute the program codes stored in the recording medium. As a result, the functions of the above-mentioned embodiments are realized, as a matter of course.

In this case, as a recording medium in which program codes are supplied, for example, a flexible disk, a hard disk, an optical disk, a magnetooptical disk, a CD-ROM, a CD-R, a magnetic tape, a nonvolatile memory card, a ROM, or the like may be used.

Further, a computer executes read-out program codes, whereby functions of the above-mentioned embodiment are realized. In addition, an OS and the like running in the computer execute part of or all of actual processing based on instructions of the program codes. This disclosure also includes a case where functions of the above-mentioned embodiments are realized based on the processing.

It should be understood by those skilled in the art that various modifications, combinations, sub-combinations and alterations may occur depending on design requirements and other factors insofar as they are within the scope of the appended claims or the equivalents thereof.

Note that the present disclosure may adopt the following configurations.

(1) A control method, comprising:
outputting a displacement value depending on a displacement amount of an input device in a case where operation is input in the input device, the operation being for a control target displayed on a display apparatus, the position of the display apparatus being specified by a first coordinate system, the position of the input device being specified by a second coordinate system;
calculating a displacement amount of the input device in the second coordinate system based on the displacement value; and
displaying the control target, the control target being moved to a position corresponding to a displacement amount in the first coordinate system by using a transformation matrix, the transformation matrix transforming a displacement amount of the input device in the second coordinate system into a displacement amount in the first coordinate system.

(2) The control method according to (1), further comprising
updating a transformation matrix based on an angular velocity value in the second coordinate system, the transformation matrix transforming angular velocity in the second coordinate system into angular velocity of the control target in the first coordinate system, the angular velocity value in the second coordinate system being received from an input device, the input device including an input device main body and an angular velocity sensor, the angular velocity sensor being accommodated in the input device main body, the angular velocity sensor being configured to detect angular velocity of the input device main body and to output the displacement value, the displacement value including an angular velocity value depending on the detected angular velocity.

(3) The control method according to (1) or (2), further comprising:

calculating a roll angle based on an acceleration value in the second coordinate system, the roll angle being an angle of rotation of the input device in a direction that the input device faces the display apparatus, the acceleration value in the second coordinate system being received from the input device, the input device including an acceleration sensor, the acceleration sensor being accommodated in the input device main body, the acceleration sensor being configured to detect acceleration and gravity acceleration of the input device main body and to output the displacement value, the displacement value including an acceleration value, the acceleration value depending on the detected acceleration and the detected gravity acceleration; and
calculating a pitch angle of the second coordinate system with respect to the first coordinate system based on the acceleration value and the gravity acceleration.

(4) The control method according to any one of (1) to (3), wherein
the transformation matrix transforms the acceleration value and the angular velocity value in the second coordinate system into acceleration and angular velocity of the control target in the first coordinate system.

(5) The control method according to any one of (1) to (4), further comprising
calculating a geomagnetic depression/elevation angle in the first coordinate system and an orientation angle of the input device with respect to the display apparatus based on a magnetic value in the second coordinate system, the magnetic value in the second coordinate system being received from the input device, the input device including a magnetic sensor, the magnetic sensor being accommodated in the input device main body, the magnetic sensor being configured to detect geomagnetic orientation and to output the displacement value, the displacement value including a magnetic value depending on the detected geomagnetic orientation.

(6) The control method according to any one of (1) to (5), further comprising:
calculating velocity and travel distance of the control target in the first coordinate system based on acceleration of the control target in the first coordinate system; and
calculating a travel angle of the control target in the first coordinate system based on angular velocity of the control target in the first coordinate system.

(7) A control apparatus, comprising:
a calculation unit configured to calculate a displacement amount of an input device in a second coordinate system based on a displacement value, the displacement value being output depending on the displacement amount of the input device in a case where operation is input in the input device, the operation being for a control target displayed on a display apparatus, the position of the display apparatus being specified by a first coordinate system, the position of the input device being specified by the second coordinate system; and
a display controller unit configured to display the control target, the control target being moved to a position corresponding to a displacement amount in the first coordinate system by using a transformation matrix, the transformation matrix transforming a displacement amount of the input device in the second coordinate system into a displacement amount in the first coordinate system.

(8) A program, causing a computer to execute the steps of:
outputting a displacement value depending on a displacement amount of an input device in a case where operation is input in the input device, the operation being for a control target displayed on a display apparatus, the position of the display apparatus being specified by a first coordinate system, the position of the input device being specified by a second coordinate system;

calculating a displacement amount of the input device in the second coordinate system based on the displacement value; and displaying the control target, the control target being moved to a position corresponding to a displacement amount in the first coordinate system by using a transformation matrix, the transformation matrix transforming a displacement amount of the input device in the second coordinate system into a displacement amount in the first coordinate system.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 10 input device
11 CPU
14 acceleration sensor
15 angular velocity sensor
16 magnetic sensor
20 input device main body
50 control apparatus
60 display apparatus
100 control system

The invention claimed is:

1. A control method, comprising:
outputting a displacement value depending on a displacement amount of an input device in a case where operation is input in the input device, the operation being for a control target displayed on a display apparatus, the position of the display apparatus being specified by a first coordinate system, the position of the input device being specified by a second coordinate system;
calculating a displacement amount of the input device in the second coordinate system based on the displacement value; and
displaying the control target, the control target being moved to a position corresponding to a displacement amount in the first coordinate system by using at least one of a first transformation matrix and a second transformation matrix, the first transformation matrix transforming the displacement amount of the input device in the second coordinate system into the displacement amount in the first coordinate system when the input device is still, the second transformation matrix transforming the displacement amount of the input device in the second coordinate system into the displacement amount in the first coordinate system when the input device is moving, wherein the first transformation matrix is obtained on the basis of posture of sensors and the second transformation matrix is obtained on the basis of a 3D rotation matrix,
wherein the input device includes a shell part divided into a plurality of divisions each having a substantially same shape, a plurality of pressure sensors configured to detect force applied to each division of the shell part, and the plurality of pressure sensors is less than the plurality of divisions, and
wherein the displacement amount of the input device is determined according to an output from the pressure sensors.

2. The control method according to claim 1, further comprising
updating a transformation matrix based on an angular velocity value in the second coordinate system, the transformation matrix transforming angular velocity in the second coordinate system into angular velocity of the control target in the first coordinate system, the angular velocity value in the second coordinate system being received from an input device, the input device including an input device main body and an angular velocity sensor, the angular velocity sensor being accommodated in the input device main body, the angular velocity sensor being configured to detect angular velocity of the input device main body and to output the displacement value, the displacement value including an angular velocity value depending on the detected angular velocity.

3. The control method according to claim 2, further comprising:
calculating a roll angle based on an acceleration value in the second coordinate system, the roll angle being an angle of rotation of the input device in a direction that the input device faces the display apparatus, the acceleration value in the second coordinate system being received from the input device, the input device including an acceleration sensor, the acceleration sensor being accommodated in the input device main body, the acceleration sensor being configured to detect acceleration and gravity acceleration of the input device main body and to output the displacement value, the displacement value including an acceleration value, the acceleration value depending on the detected acceleration and the detected gravity acceleration; and
calculating a pitch angle of the second coordinate system with respect to the first coordinate system based on the acceleration value and the gravity acceleration.

4. The control method according to claim 3, wherein
the transformation matrix transforms the acceleration value and the angular velocity value in the second coordinate system into acceleration and angular velocity of the control target in the first coordinate system.

5. The control method according to claim 4, further comprising
calculating a geomagnetic depression/elevation angle in the first coordinate system and an orientation angle of the input device with respect to the display apparatus based on a magnetic value in the second coordinate system, the magnetic value in the second coordinate system being received from the input device, the input device including a magnetic sensor, the magnetic sensor being accommodated in the input device main body, the magnetic sensor being configured to detect geomagnetic orientation and to output the displacement value, the displacement value including a magnetic value depending on the detected geomagnetic orientation.

6. The control method according to claim 5, further comprising:

calculating velocity and travel distance of the control target in the first coordinate system based on acceleration of the control target in the first coordinate system; and calculating a travel angle of the control target in the first coordinate system based on angular velocity of the control target in the first coordinate system.

7. The control method according to claim 1, wherein the input device has a substantially spherical shape.

8. The control method according to claim 1, wherein the control target is configured to be displayed as a three dimensional control target.

9. The control method according to claim 1, further comprising determining if the control target starts moving based on operation input in at least one of the pressure sensors.

10. The control method according to claim 1, wherein the pressure sensors are provided at intersection points of the divisions, and each of the pressure sensors has a same distance from each other.

11. The control method according to claim 1, wherein the 3D rotation matrix is expressed as $R^{\omega\theta}$ which is expressed by the flowing formula, $$R^{\omega\theta} = \begin{bmatrix} \cos\theta + \lambda^2(1-\cos\theta) & \lambda\mu(1-\cos\theta) - \nu\sin\theta & \nu\lambda(1-\cos\theta) + \mu\sin\theta \\ \lambda\nu(1-\cos\theta) + \nu\sin\theta & \cos\theta + \mu^2(1-\cos\theta) & \mu\nu(1-\cos\theta) - \lambda\sin\theta \\ \nu\lambda(1-\cos\theta) - \mu\sin\theta & \mu\nu(1-\cos\theta) + \lambda\sin\theta & \cos\theta + \nu^2(1-\cos\theta) \end{bmatrix}$$

wherein ω is angular velocity, θ is roll angle, λ, μ and ν are indicative of elements of unit vectors.

12. A control apparatus, comprising:
a calculation unit configured to calculate a displacement amount of an input device in a second coordinate system based on a displacement value, the displacement value being output depending on the displacement amount of the input device in a case where operation is input in the input device, the operation being for a control target displayed on a display apparatus, the position of the display apparatus being specified by a first coordinate system, the position of the input device being specified by the second coordinate system; and a display controller unit configured to display the control target, the control target being moved to a position corresponding to a displacement amount in the first coordinate system by using at least one of a first transformation matrix and a second transformation matrix, the first transformation matrix transforming the displacement amount of the input device in the second coordinate system into the displacement amount in the first coordinate system when the input device is still, the second transformation matrix transforming the displacement amount of the input device in the second coordinate system into the displacement amount in the first coordinate system when the input device is moving, wherein the first transformation matrix is obtained on the basis of posture of sensors and the second transformation matrix is obtained on the basis of a 3D rotation matrix, wherein the input device includes a shell part divided into a plurality of divisions each having a substantially same shape, a plurality of pressure sensors configured to detect force applied to each division of the shell part, and the plurality of pressure sensors is less than the plurality of divisions, and wherein the displacement amount of the input device is determined according to an output from the pressure sensors.

13. A non-transitory computer readable storage medium storing a program, causing a computer to execute the steps of:

outputting a displacement value depending on a displacement amount of an input device in a case where operation is input in the input device, the operation being for a control target displayed on a display apparatus, the position of the display apparatus being specified by a first coordinate system, the position of the input device being specified by a second coordinate system;

calculating a displacement amount of the input device in the second coordinate system based on the displacement value; and displaying the control target, the control target being moved to a position corresponding to a displacement amount in the first coordinate system by using at least one of a first transformation matrix and a second transformation matrix, the first transformation matrix transforming the displacement amount of the input device in the second coordinate system into the displacement amount in the first coordinate system when the input device is still, the second transformation matrix transforming the displacement amount of the input device in the second coordinate system into the displacement amount in the first coordinate system when the input device is moving, wherein the first transformation matrix is obtained on the basis of posture of sensors and the second transformation matrix is obtained on the basis of a 3D rotation matrix, wherein the input device includes a shell part divided into a plurality of divisions each having a substantially same shape, a plurality of pressure sensors configured to detect force applied to each division of the shell part, and the plurality of pressure sensors is less than the plurality of divisions, and wherein the displacement amount of the input device is determined according to an output from the pressure sensors.

* * * * *